United States Patent
Park et al.

(10) Patent No.: US 12,412,946 B2
(45) Date of Patent: Sep. 9, 2025

(54) BATTERY MODULE

(71) Applicant: Samsung SDI Co., Ltd., Yongin-si (KR)

(72) Inventors: Daeyeop Park, Yongin-si (KR); Sungyong Kim, Yongin-si (KR); Jaeho Kim, Yongin-si (KR); Soodeok Moon, Yongin-si (KR); Jangwoong Bae, Yongin-si (KR); Junhyung Lee, Yongin-si (KR); Dooyong Lim, Yongin-si (KR); Jisoon Lim, Yongin-si (KR); Eungi Heo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 18/525,059

(22) Filed: Nov. 30, 2023

(65) Prior Publication Data

US 2024/0106028 A1    Mar. 28, 2024

Related U.S. Application Data

(63) Continuation of application No. 16/655,889, filed on Oct. 17, 2019, now Pat. No. 11,862,778.

(30) Foreign Application Priority Data

Oct. 19, 2018  (KR) .................. 10-2018-0125551

(51) Int. Cl.
| | |
|---|---|
| *H01M 10/6556* | (2014.01) |
| *H01M 10/613* | (2014.01) |
| *H01M 10/625* | (2014.01) |
| *H01M 10/647* | (2014.01) |
| *H01M 50/209* | (2021.01) |
| *H01M 50/289* | (2021.01) |
| *H01M 50/505* | (2021.01) |

(52) U.S. Cl.
CPC ..... *H01M 10/6556* (2015.04); *H01M 10/613* (2015.04); *H01M 10/625* (2015.04); *H01M 10/647* (2015.04); *H01M 50/209* (2021.01); *H01M 50/289* (2021.01); *H01M 50/505* (2021.01); *H01M 2220/20* (2013.01)

(58) Field of Classification Search
CPC .......... H01M 10/6556; H01M 10/613; H01M 10/625; H01M 10/647; H01M 50/209; H01M 50/289; H01M 50/505; H01M 2220/20; H01M 10/6554; H01M 50/24; H01M 50/20; H01M 10/6567; Y02E 60/10; Y02P 70/50
See application file for complete search history.

(56) References Cited

U.S. PATENT DOCUMENTS

| | | | |
|---|---|---|---|
| 6,146,778 A | 11/2000 | Rouillard et al. | |
| 6,255,015 B1 | 7/2001 | Corrigan et al. | |
| 6,555,264 B1 | 4/2003 | Hamada et al. | |
| 6,864,013 B2 | 3/2005 | Gow et al. | |
| 2005/0079408 A1 | 4/2005 | Hirano | |
| 2005/0255379 A1 | 11/2005 | Marchio et al. | |
| 2007/0005371 A1 | 1/2007 | Nakagawa et al. | |
| 2007/0054561 A1 | 3/2007 | Gutman et al. | |
| 2007/0087266 A1 | 4/2007 | Bourke et al. | |
| 2010/0009251 A1 | 1/2010 | Shin et al. | |
| 2010/0266887 A1 | 10/2010 | Sekino et al. | |
| 2010/0285347 A1 | 11/2010 | Saito et al. | |
| 2011/0076521 A1 | 3/2011 | Shimizu et al. | |
| 2011/0165451 A1 | 7/2011 | Kim et al. | |
| 2011/0300433 A1 | 12/2011 | Kim | |
| 2012/0103714 A1 | 5/2012 | Choi et al. | |
| 2012/0115013 A1 | 5/2012 | Kim et al. | |
| 2012/0177970 A1 | 7/2012 | Marchio et al. | |
| 2013/0045403 A1 | 2/2013 | Shin et al. | |
| 2013/0089763 A1 | 4/2013 | Lee | |
| 2013/0207459 A1 | 8/2013 | Schröder et al. | |

(Continued)

FOREIGN PATENT DOCUMENTS

| | | |
|---|---|---|
| CN | 1324499 A | 11/2001 |
| CN | 1592977 A | 3/2005 |

(Continued)

OTHER PUBLICATIONS

Extended European Search Report for corresponding European Patent Application No. 19203933.7, dated Feb. 20, 2020, 10 pages.

(Continued)

*Primary Examiner* — Muhammad S Siddiquee

(74) *Attorney, Agent, or Firm* — Womble Bond Dickinson (US) LLP

(57) ABSTRACT

A battery module includes a module including a series of cell stacks, each having a series of unit cells arranged in a first direction, and an insulation member insulating at least one unit cell. The battery module also includes a module housing and a series of receiving parts in the module housing accommodating the cell stacks. Each receiving part includes a fixed wall around a respective cell stack and having a portion in contact with the cell stack. The fixed wall includes a pair of end walls at opposite ends of the receiving part in the first direction. The pair of end walls are configured to engage respective end surfaces of the corresponding cell stack in the first direction. The battery module also includes a cooling channel below a floor surface of the module housing for a coolant to flow to cool the receiving parts and the cells stacks.

14 Claims, 12 Drawing Sheets

(56) References Cited

U.S. PATENT DOCUMENTS

| | | |
|---|---|---|
| 2013/0260195 A1 | 10/2013 | Long |
| 2014/0087221 A1 | 3/2014 | Kim et al. |
| 2014/0141311 A1 | 5/2014 | Michelitsch |
| 2014/0234690 A1 | 8/2014 | Le et al. |
| 2014/0353057 A1 | 12/2014 | Adachi |
| 2015/0042158 A1 | 2/2015 | Schmidt et al. |
| 2015/0072178 A1 | 3/2015 | Gu |
| 2015/0086831 A1 | 3/2015 | Haussmann |
| 2015/0229010 A1 | 8/2015 | Ahn |
| 2015/0357617 A1 | 12/2015 | Okada |
| 2016/0028056 A1 | 1/2016 | Lee et al. |
| 2016/0056427 A1 | 2/2016 | Kim et al. |
| 2016/0118635 A1 | 4/2016 | Keller et al. |
| 2016/0164054 A1 | 6/2016 | Yamamoto et al. |
| 2016/0233464 A1 | 8/2016 | Nusier et al. |
| 2016/0233468 A1 | 8/2016 | Nusier et al. |
| 2016/0268657 A1 | 9/2016 | Park et al. |
| 2017/0062783 A1 | 3/2017 | Kim et al. |
| 2017/0062789 A1 | 3/2017 | Sim et al. |
| 2017/0133706 A1 | 5/2017 | Ejima |
| 2017/0222200 A1 | 8/2017 | Murai et al. |
| 2017/0263910 A1 | 9/2017 | Kobayashi et al. |
| 2017/0365888 A1 | 12/2017 | Kwon et al. |
| 2018/0013111 A1 | 1/2018 | Wuensche et al. |
| 2018/0026243 A1* | 1/2018 | Stojanovic ............ B60L 58/21 |
| | | 429/99 |
| 2018/0048039 A1 | 2/2018 | Newman et al. |
| 2018/0102576 A1* | 4/2018 | Yamamoto ........ H01M 10/6556 |
| 2018/0109016 A1 | 4/2018 | Fees et al. |
| 2018/0123200 A1 | 5/2018 | Golubkov |
| 2018/0138466 A1 | 5/2018 | Fees et al. |
| 2018/0138473 A1 | 5/2018 | Bessho et al. |
| 2018/0138560 A1 | 5/2018 | Bessho |
| 2018/0175466 A1* | 6/2018 | Seo ................... H01M 10/6554 |
| 2018/0183033 A1 | 6/2018 | You |
| 2018/0269443 A1* | 9/2018 | Takahashi ........... H01M 50/262 |
| 2018/0294452 A1 | 10/2018 | Tan et al. |
| 2018/0331402 A1* | 11/2018 | Inoue ................. H01M 10/6563 |
| 2018/0337374 A1 | 11/2018 | Matecki et al. |
| 2019/0001838 A1 | 1/2019 | Choi et al. |
| 2019/0088911 A1 | 3/2019 | Peng et al. |
| 2019/0123318 A1 | 4/2019 | Fees et al. |
| 2019/0198845 A1 | 6/2019 | Bae et al. |
| 2019/0221817 A1 | 7/2019 | Jeon |
| 2019/0296294 A1 | 9/2019 | Hirschbeck et al. |
| 2019/0305273 A1 | 10/2019 | Long et al. |
| 2019/0348725 A1 | 11/2019 | Golubkov |
| 2020/0006824 A1* | 1/2020 | Lim .................... H01M 10/625 |
| 2020/0067155 A1* | 2/2020 | Hwang ............ H01M 10/6551 |
| 2020/0127258 A1 | 4/2020 | Lim et al. |
| 2020/0313128 A1 | 10/2020 | Schnakenberg |
| 2021/0143505 A1 | 5/2021 | Hidaka |

FOREIGN PATENT DOCUMENTS

| | | |
|---|---|---|
| CN | 102117930 A | 7/2011 |
| CN | 102270754 A | 12/2011 |
| CN | 102934254 A | 2/2013 |
| CN | 103035975 A | 4/2013 |
| CN | 103380511 A | 10/2013 |
| CN | 103890997 A | 6/2014 |
| CN | 104137294 A | 11/2014 |
| CN | 104617244 A | 5/2015 |
| CN | 104835980 A | 8/2015 |
| CN | 104904033 A | 9/2015 |
| CN | 104995760 A | 10/2015 |
| CN | 105552261 A | 5/2016 |
| CN | 105870370 A | 8/2016 |
| CN | 205768594 U | 12/2016 |
| CN | 106299176 A | 1/2017 |
| CN | 106486622 A | 3/2017 |
| CN | 106797005 A | 5/2017 |
| CN | 206210887 U | 5/2017 |
| CN | 206250254 U | 6/2017 |
| CN | 206584990 U | 10/2017 |
| CN | 107528019 A | 12/2017 |
| CN | 107591500 A | 1/2018 |
| CN | 107644960 A | 1/2018 |
| CN | 107658401 A | 2/2018 |
| CN | 207199697 U | 4/2018 |
| CN | 207398218 U | 5/2018 |
| CN | 207602661 U | 7/2018 |
| CN | 108365156 A | 8/2018 |
| CN | 108463902 A | 8/2018 |
| CN | 207690855 U | 8/2018 |
| CN | 108520931 A | 9/2018 |
| CN | 207818706 U | 9/2018 |
| CN | 108630851 A | 10/2018 |
| CN | 210628373 U | 5/2020 |
| EP | 2450990 A2 | 5/2012 |
| EP | 2 608 309 A1 | 6/2013 |
| EP | 3 273 500 A1 | 1/2018 |
| EP | 3267507 A1 | 1/2018 |
| EP | 3 316 340 A1 | 5/2018 |
| EP | 3 327 817 A1 | 5/2018 |
| JP | 2003-249202 A | 9/2003 |
| JP | 2004-171856 A | 6/2004 |
| JP | 3906706 B2 | 4/2007 |
| JP | 2009-231042 A | 10/2009 |
| JP | 2013-8521 A | 1/2013 |
| JP | 2017-37754 A | 2/2017 |
| JP | 6095813 B2 | 3/2017 |
| JP | 6117308 B2 | 4/2017 |
| JP | 6224321 B2 | 11/2017 |
| JP | 2018-073551 A | 5/2018 |
| KR | 10-2010-0055477 A | 5/2010 |
| KR | 10-2013-0001381 A | 1/2013 |
| KR | 10-2013-0078933 A | 7/2013 |
| KR | 10-2013-0113740 A | 10/2013 |
| KR | 10-2015-0029371 A | 3/2015 |
| KR | 10-1584295 B1 | 1/2016 |
| KR | 10-2016-0037542 A | 4/2016 |
| KR | 10-2017-0011212 A | 2/2017 |
| KR | 10-2017-0025074 A | 3/2017 |
| KR | 10-2017-0053429 A | 5/2017 |
| KR | 10-2018-0010989 A | 1/2018 |
| KR | 10-2018-0045840 A | 5/2018 |
| KR | 10-2018-0054382 A | 5/2018 |
| KR | 10-2018-0060997 A | 6/2018 |
| KR | 10-2019-0079367 A | 7/2019 |
| WO | WO 00/11730 A1 | 3/2000 |
| WO | WO 2007/027603 A2 | 3/2007 |
| WO | WO 2016/166972 A1 | 10/2016 |
| WO | WO 2017/132575 A1 | 8/2017 |
| WO | WO 2017/203911 A1 | 11/2017 |
| WO | WO 2017/220515 A1 | 12/2017 |
| WO | WO 2018/016816 A1 | 1/2018 |
| WO | WO 2018/062869 A1 | 4/2018 |
| WO | WO 2018/105981 A1 | 6/2018 |
| WO | WO 2018/142809 A1 | 8/2018 |

OTHER PUBLICATIONS

Extended European Search Report for corresponding European Patent Application No. 19203930.3, dated Feb. 24, 2020, 6 pages.
Extended European Search Report for corresponding European Patent Application No. 19203917.0, dated Feb. 24, 2020, 7 pages.
Extended European Search Report for corresponding European Patent Application No. 19203935.2, dated Feb. 24, 2020, 9 pages.
Extended European Search Report for corresponding European Patent Application No. 19203939.4, dated Feb. 28, 2020, 10 pages.
U.S. Notice of Allowance dated Mar. 9, 2022, for U.S. Appl. No. 16/656,099, 9 pages.
U.S. Office Action dated Feb. 25, 2022, for U.S. Appl. No. 16/656,406, 9 pages.
US Final Office Action dated Jun. 3, 2024, issued in U.S. Appl. No. 18/186,797 (13 pages).
US Office Action dated Feb. 14, 2024, issued in U.S. Appl. No. 18/186,797 (12 pages).
Chinese Notice of Allowance dated Jun. 15, 2022, issued in Chinese Patent Application No. 201910989841.2 (7 pages).

(56) References Cited

OTHER PUBLICATIONS

Chinese Notice of Allowance, with English translation, dated Jul. 25, 2022, issued in Chinese Patent Application No. 201910988354.4 (6 pages).
Chinese Notice of Allowance, with English translation, dated Jul. 10, 2023, issued in Chinese Patent Application No. 201910989674.1 (9 pages).
Chinese Notice of Allowance, with English translation, dated Nov. 4, 2022, issued in corresponding Chinese Patent Application No. 201910990468.2 (6 pages).
Chinese Office Action dated Jun. 15, 2022, issued in Chinese Patent Application No. 201910988939.6 (9 pages).
Chinese Office Action, with English translation, dated Dec. 23, 2021, issued in corresponding Chinese Patent Application No. 201910990468.2 (15 pages).
Chinese Office Action, with English translation, dated Dec. 2, 2021, issued in Chinese Patent Application No. 201910988939.6 (22 pages).
Chinese Office Action, with English translation, dated Dec. 21, 2021, issued in corresponding Chinese Patent Application No. 201910989914.8 (18 pages).
Chinese Office Action, with English translation, dated Dec. 24, 2021, issued in Chinese Patent Application No. 201910988354.4 (21 pages).
Chinese Office Action, with English translation, dated Dec. 28, 2021, issued in Chinese Patent Application No. 201910989841.2 (16 pages).
Chinese Office Action, with English translation, dated Dec. 3, 2021, issued in Chinese Patent Application No. 201910989674.1 (23 pages).
Chinese Office Action, with English translation, dated Jul. 22, 2022, issued in Chinese Patent Application No. 201910989674.1 (19 pages).
Chinese Office Acton, with English translation, dated Aug. 3, 2022, issued in Chinese Patent Application No. 201910990468.2 (27 pages).
EPO Extended European Search Report dated May 2, 2023, issued in European Patent Application No. 23150872.2 (7 pages).
EPO Extended Search Report dated Mar. 4, 2020, corresponding to European Patent Application No. 19203926.1 (7 pages).
EPO Office Action dated Aug. 5, 2022, issued in European Patent Application No. 19203939.4 (4 pages).
EPO Office Action dated Jul. 26, 2022, issued in European Patent Application No. 19203930.3 (5 pages).
EPO Office Action dated Sep. 1, 2022, issued in European Patent Application No. 19203935.2 (4 pages).
Korean Office Action dated Jun. 20, 2023, issued in Korean Patent Application No. 10-2018-0125553 (6 pages).
Korean Office Action dated Jun. 20, 2023, issued in Korean Patent Application No. 10-2018-0125552 (5 pages).
Korean Office Action dated Jun. 20, 2023, issued in Korean Patent Application No. 10-2018-0125551 (6 pages).
Korean Office Action dated Jun. 20, 2023, issued in Korean Patent Application No. 10-2018-0125550 (7 pages).
Korean Office Action dated May 31, 2023, issued in Korean Patent Application No. 10-2018-0125549 (6 pages).
U.S. Advisory Action dated Sep. 2, 2021, issued in U.S. Appl. No. 16/656,324 (3 pages).
U.S. Final Office Action dated Jun. 29, 2021, issued in U.S. Appl. No. 16/656,324 (15 pages).
U.S. Notice of Allowance dated Aug. 17, 2022, issued in U.S. Appl. No. 16/656,406 (5 pages).
U.S. Notice of Allowance dated Jan. 10, 2022, issued in U.S. Appl. No. 16/656,324 (8 pages).
U.S. Notice of Allowance dated Jul. 20, 2022, issued in U.S. Appl. No. 16/656,324 (11 pages).
U.S. Notice of Allowance dated Jul. 25, 2022, issued in U.S. Appl. No. 16/656,099 (9 pages).
U.S. Notice of Allowance dated Jun. 28, 2022, issued in U.S. Appl. No. 16/656,324 (7 pages).
U.S. Notice of Allowance dated Nov. 16, 2021, issued in U.S. Appl. No. 16/656,099 (9 pages).
U.S. Notice of Allowance from U.S. Appl. No. 16/656,324, dated May 4, 2022, 11 pages.
U.S. Office Action dated Jul. 7, 2021, issued in U.S. Appl. No. 16/656,099 (9 pages).
U.S. Office Action dated Mar. 17, 2021, issued in U.S. Appl. No. 16/656,324 (17 pages).
U.S. Office Action dated Nov. 29, 2021, issued in U.S. Appl. No. 16/656,190 (15 pages).
U.S. Office Action dated Oct. 26, 2021, issued in U.S. Appl. No. 16/656,197 (11 pages).
U.S. Office Action dated Sep. 1, 2021, issued in U.S. Appl. No. 16/656,406 (10 pages).
U.S. Office Action from U.S. Appl. No. 16/656,190, dated May 19, 2022, 17 pages.
U.S. Office Action from U.S. Appl. No. 16/656,197, dated Apr. 27, 2022, 20 pages.
U.S. Office Action from U.S. Appl. No. 16/656,406, dated May 4, 2022, 9 pages.
US Final Office Action dated Mar. 20, 2023, issued in U.S. Appl. No. 16/656,190 (20 pages).
US Final Office Action dated Mar. 23, 2023, issued in U.S. Appl. No. 16/656,197 (13 pages).
US Notice of Allowance dated Dec. 7, 2022, issued in U.S. Appl. No. 16/656,406 (5 pages).
US Notice of Allowance dated Dec. 7, 2022, issued in U.S. Appl. No. 16/656,324 (8 pages).
US Notice of Allowance dated Nov. 22, 2022, issued in U.S. Appl. No. 16/656,099 (9 pages).
US Office Action dated Jul. 11, 2023, issued in U.S. Appl. No. 18/184,637 (6 pages).
US Office Action dated Sep. 23, 2022, issued in U.S. Appl. No. 16/656,190 (22 pages).
US Office Action dated Sep. 29, 2022, issued in U.S. Appl. No. 16/656,197 (14 pages).
US Office Action dated Sep. 12, 2024, issued in U.S. Appl. No. 18/589,415 (6 pages).
EPO Extended European Search Report dated Mar. 27, 2025, issued in European Patent Application No. 23194224.4, 8 pages.
US Office Action dated Nov. 26, 2024, issued in U.S. Appl. No. 18/186,797 (16 pages).
Chinese Office Action dated Aug. 6, 2025, issued in corresponding Chinese Patent Application No. 202310087447.6 (12 pages).

\* cited by examiner

BATTERY MODULE

CROSS-REFERENCE TO RELATED APPLICATIONS

This application is a continuation of U.S. patent application Ser. No. 16/655,889, filed Oct. 17, 2019, which claims priority to and the benefit of Korean Patent Application No. 10-2018-0125551 filed in the Korean Intellectual Property Office on Oct. 19, 2018, the entire contents of which are incorporated herein by reference, and incorporates, in their entirety, by reference U.S. patent application Ser. No. 16/656,197, U.S. patent application Ser. No. 16/656,324, U.S. patent application Ser. No. 16/656,190, U.S. patent application Ser. No. 16/656,406, and U.S. patent application Ser. No. 16/656,099, all filed on Oct. 17, 2019.

BACKGROUND

(a) Field

The present disclosure relates to a battery module, and to a battery module including a plurality of cell stacks formed of a plurality of unit cells.

(b) Description of the Related Art

A rechargeable or secondary battery is different from a primary battery in that charge and discharge are repeatable, and the primary battery provides only irreversible conversion from a chemical material to electric energy. A low-capacity rechargeable battery may be used as a power source of a small electronic device, such as a mobile phone, a notebook computer, a computer, and a camcorder, and a large-capacity rechargeable battery may be used as a power source of a hybrid vehicle and the like.

The secondary battery may include a positive electrode, a negative electrode, an electrode assembly including a separator interposed between the positive electrode and the negative electrode, a case accommodating the electrode assembly, and an electrode terminal electrically connected with the electrode assembly.

An electrolyte solution is injected into the case so as to enable a battery to be chargeable and rechargeable by an electrochemical reaction of the positive electrode, the negative electrode, and the electrolyte solution. For example, a shape of the case may be a cylindrical shape or a rectangular shape, which may be different depending on the use of the battery.

The rechargeable battery may be used in the form of a cell stack including a plurality of unit cells which are coupled in series with, or in parallel to, each other, thereby providing high energy density for driving of a hybrid vehicle, for example.

Additionally, with the development of technology, an amount of electric power required for an electric vehicle (EV), a hybrid electric vehicle (HEV) and other electrical energy consuming devices is increased, and a plurality of battery modules may be provided to satisfy the amount of electric power.

Therefore, the development of a new module structure that may simplify the components, effectively reduce the manufacturing cost and weight, and enable the manufacturing process to proceed efficiently while providing a plurality of cell stacks capable of meeting the required power of the electrical energy consuming device is an important task.

The above information disclosed in this Background section is only for enhancement of understanding of the background of the invention and therefore it may contain information that does not form the prior art that is already known in this country to a person of ordinary skill in the art.

SUMMARY

The present invention has been made in an effort to provide a large module of a battery having advantages of effectively improving an amount of electric power, and efficiently improving the manufacturing process while simplifying components by including a plurality of cell stacks. A battery module according to an exemplary embodiment of the present invention includes at least one module including a series of cell stacks, each cell stack of the series of cell stacks including a series of unit cells arranged in a first direction and an insulation member insulating at least one unit cell of the series of unit cells. The battery module also includes a module housing and a series of receiving parts in the module housing configured to accommodate the series of cell stacks. Each receiving part of the series of receiving parts includes a fixed wall around a corresponding cell stack of the series of cell stacks, the fixed wall including a pair of end walls at opposite ends of the receiving part in the first direction. The pair of end walls are configured to engage respective end surfaces of the corresponding cell stack in the first direction. A cooling channel for a coolant to flow to cool the series of receiving parts and the series of cell stacks is below a floor surface of the module housing.

A cooling plate may be coupled to the floor surface of the module housing, and the cooling channel may be defined in the cooling plate.

The module housing may include at least one lateral wall protruding downward and surrounding the floor surface. The at least one lateral wall may define the cooling channel. The at least one module may further include a channel cover coupled to lower ends of the at least one lateral wall to close and seal the cooling channel.

The at least one lateral wall of the module housing may be integral with the floor surface.

The at least one module may include a first module and a second module adjacent to the first module and coupled to the first module.

The battery module may further include a coupling part coupling the module housing of the first module to the module housing of the second module, and a coolant line connected to the cooling channel of the module housing of each of the first and second modules.

The module housing of the first module may be coupled to the module housing of the second module in a second direction perpendicular to the first direction, and the coolant line may extend in the second direction and include a series of port connection holes spaced apart from each other along a length direction of the coolant line and coupled to the cooling channel of each of the first and second modules.

The coupling part may include a first coupling part in a first wall of the module housing of the first module and a second coupling part in a second wall of the module housing of the second module. The first wall is spaced apart from the second wall in the second direction.

The coolant line may include an inflow line configured to supply coolant to the cooling channel and an outflow line through which the coolant is discharged from the cooling channel. The inflow line is connected to one side of the cooling channel of each of the first and second modules, the outflow line is connected to the other side of the cooling channel of each of the first and second modules, and the one side and the other side of the cooling channel are at opposite sides along the first direction.

At least one of the series of port connection holes may have a different diameter than at least one other port connection hole of the series of port connection holes.

The module housing may further include a separation wall that extends in the first direction and partitions an inner space surrounded by an outer wall of the module housing to form the plurality of receiving parts. The separation wall may define a part of the fixed wall of each of the series of receiving parts at sides along a second direction that is perpendicular to the first direction. The separation wall may contact side surfaces of a pair of cell stacks of the series of cell stacks in respective receiving parts of the series of receiving parts.

An end wall of the pair of end walls facing the outer wall of the module housing may be spaced apart from the outer wall along the first direction and may define a first impact absorption space between the end wall and the outer wall.

The series of receiving parts may include two receiving parts adjacent to each other along the first direction, and end walls of the two receiving parts facing each other in the first direction may be spaced apart from each other to define a second impact absorption space between the end walls.

Each cell stack of the series of cell stacks may further include a pair of end supports at opposite end portions in the first direction, and the pair of end supports may have outer surfaces corresponding to the end surfaces.

The end walls may be bent outwardly such that central portions of the end walls are spaced away from the end surfaces, and the end surfaces may be recessed inwardly such that central portions of the end surfaces are spaced away from the end walls.

At least one end wall of the end walls may include a series of first ribs protruding in the first direction from an outer surface. The plurality of first ribs may be spaced apart from each other in the second direction and may extend in a third direction perpendicular to each of the first and second directions.

At least one end support of the pair of end supports may include a series of second ribs protruding toward the at least one end wall from the end surface and may be spaced apart from each other in the second direction and the third direction.

The series of second ribs may have a lattice structure.

According to an embodiment of the present invention, by including a plurality of cell stacks, the amount of electric power may be effectively improved, and the manufacturing process may be efficiently improved while simplifying the components.

DETAILED DESCRIPTION

Figure 1:
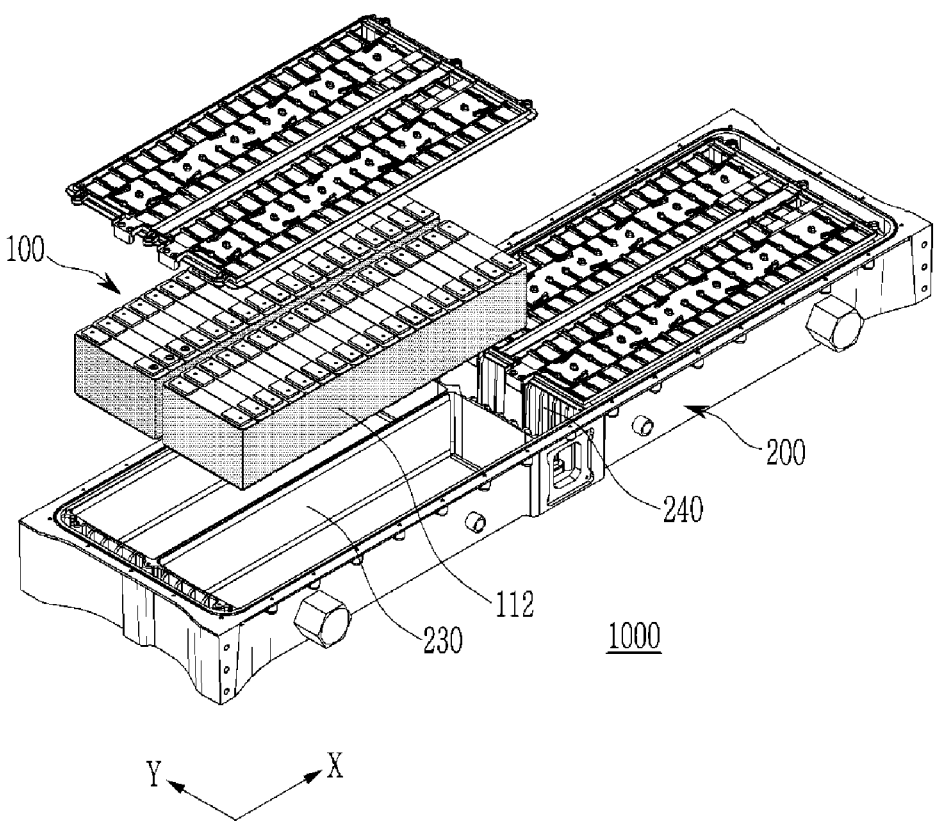
FIG. 1 is a view illustrating a battery module according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the present specification, an overlapped description for the same components will be omitted.

Further, in the present specification, it is to be understood that when one component is referred to as being 'connected to' another component, it may be connected directly to another component or be connected to another component with the other component interposed therebetween. On the other hand, in the present specification, it is to be understood that when one component is referred to as being 'directly connected to' another component, it may be connected to another component without the other component interposed therebetween.

In addition, terms used in the present specification are used only in order to describe specific exemplary embodiments rather than limiting the present invention.

Further, in the present specification, singular forms are intended to include plural forms unless the context clearly indicates otherwise.

It should be further understood that terms "include" or "have" used in the present specification specify the presence of features, numerals, steps, operations, components, parts mentioned in the present specification, or combinations thereof, but do not preclude the presence or addition of one or more other features, numerals, steps, operations, components, parts, or combinations thereof.

Further, in the present specification, a term 'and/or' includes a combination of a plurality of stated items or any one of the plurality of stated items. In the present specification, 'A or B' may include 'A', 'B', or 'both of A and B'.

Figure 2:
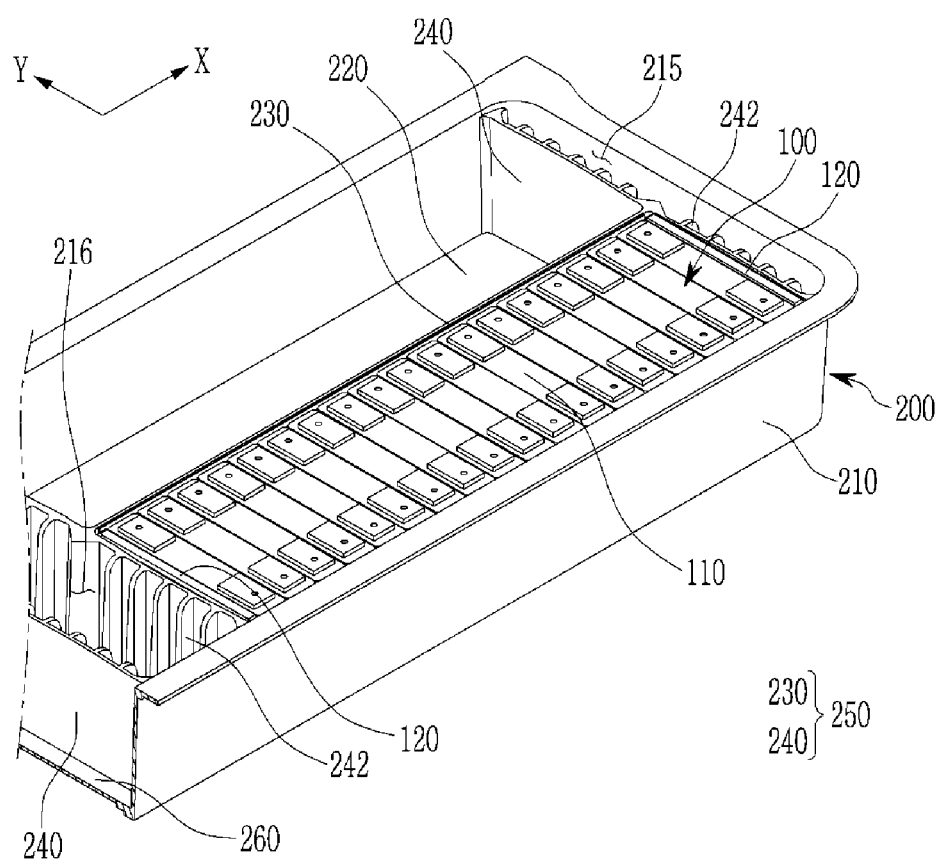
FIG. 2 is a view illustrating a receiving part in the battery module battery according to an exemplary embodiment of the present invention.

FIG. 1 illustrates a battery module 1000 according to an exemplary embodiment of the present invention and FIG. 2 illustrates a view illustrating a receiving part 220 illustrated in FIG. 1.

As illustrated in FIGS. 1 and 2, the battery module 1000 according to an exemplary embodiment of the present invention includes a cell stack 100 in which a plurality of unit cells 110 are aligned in a first direction X and including an insulation member 112 around (or surrounding) the plurality of unit cells 110, and a module housing 200 in which a plurality of receiving parts 220 into which the cell stack 100 is inserted are provided, wherein the receiving part 220 includes a fixed wall 250 around (or surrounding) the cell stack 100 and having at least a portion which is in contact with the cell stack 100.

The cell stack 100 includes the plurality of unit cells 110 aligned in the first direction X. The unit cell 100 may include an electrode assembly, correspond to one secondary battery including a terminal part, and include a case of various shapes such as a rectangular shape, a cylindrical shape, or the like.

FIGS. 1 and 2 illustrates the unit cell 110 having a case having a rectangular pillar shape, but the unit cell 110 is not necessarily limited thereto, and the unit cell 110 having the case of the rectangular shape illustrated in FIGS. 1 and 2 will hereinafter be described for convenience of explanation.

The plurality of unit cells 110 are aligned in the cell stack 100, and an alignment direction of the unit cells 110 may be various, but the unit cells 110 may be preferably aligned in a direction in which wide side surfaces of side surfaces of the unit cells 110 face each other, as illustrated in FIGS. 1 and 2. The alignment direction of the unit cells 110 will hereinafter be defined as the first direction X. The unit cells 110 may be disposed or the end supports 120 may be disposed at both ends of the cell stack 100 in the first direction X.

The number of unit cells 110 configuring the cell stack 100 may be various as necessary. The unit cells 110 included in one cell stack 100 may be electrically connected with each other by using a bus bar, which can be provided in various shapes, and the like.

In the meantime, the cell stack 100 includes the insulation member 112 around (or surrounding) the plurality of unit cells 110. The insulation member 112 is formed of an insulating material, such as rubber and plastic, and surrounds the plurality of unit cells 110.

In one or more embodiments, the insulation member 112 may also be provided so as to surround end supports 120 disposed at both ends of the cell stack 100 in the first direction X together with the plurality of unit cells 110, and may surround only the plurality of unit cells 110, except for the end supports 120, and the end supports 120 may also be separately disposed at both ends of the cell stack 100.

The insulation member 112 may be provided in the form of a film, or a plurality of configurations shaped like a plate having hardness may be provided in the insulation member 112. The insulation member 112 may be provided in the form around (or surrounding) all of the four lateral surfaces of the cell stack 100 or may be disposed at some of the four lateral surfaces, and may also be provided so as to surround both an upper surface and a lower surface of the cell stack 100. However, the insulation member 112 disposed on the upper surface of the cell stack 100 may be provided so as to expose the terminal unit of each unit cell 110.

FIG. 1 illustrates the state where the insulation member 112 is prepared in the form of an insulation film to surround the lateral surfaces of the plurality of unit cells 110, except for the end supports 120, in the cell stack 100 according to one exemplary embodiment of the present invention.

In the module housing 200, a plurality of receiving parts 220, into and/or onto which the cell stacks 100 are inserted, is provided. FIG. 1 illustrates the state where four receiving parts 220 are formed in the module housing 200, and in FIG. 2, two receiving parts 220 are separately illustrated in the module housing 200 illustrated in FIG. 1. The number of receiving parts 220 provided in the module housing 200 may be changed as desired.

In the module housing 200, an outer wall 210, which protrudes from a floor surface 260 in an upper direction and surrounds the floor surface 260, is present, and an internal space is formed at an inner side of the outer wall 210. The plurality of receiving parts 220 may be provided in the internal space.

A shape of the module housing 200 may be various, and the module housing 200 according to one exemplary embodiment of the present invention may be provided so as to have the floor surface 260 having an approximately quadrangular shape as illustrated in FIGS. 1 and 2.

The module housing 200 may be provided in the form in which an upper portion of the module housing 200 is opened, and thus, the receiving part 220 provided in the module housing 200 may also be provided in the form in which an upper portion of the receiving part 220 is opened. A module cover may be coupled to the opened upper surface of the module housing 200, so that the module housing 200 may be sealed, and when the module cover is coupled with the module housing 200, the module cover corresponds to the upper surface of the receiving part 220. The module cover may include a bus bar holder for covering the cell stack 100, and bus bars arranged in the bus bar holder to electrically connect the unit cells 110 constituting the cell stack 100.

Additionally, FIGS. 1 and 2 illustrate the receiving part 220 according to one exemplary embodiment of the present invention. The receiving part 220 includes the fixed wall 250 which surrounds the cell stack 100 and of which at least a part is in contact with the cell stack 100.

FIG. 1 illustrates the state where the portion of the receiving part 220 into which the cell stack 100 is inserted, and the portion of the receiving part 220 into which the cell stack 100 is not inserted, are disposed in parallel. The fixed wall 250 corresponds to a boundary wall around (or surrounding) an area of the receiving part 220, and the cell stack 100 inserted into the receiving part 220 stably maintains a fixed state surrounded by the fixed wall 250 in four directions.

The fixed wall 250 may be variously disposed according to the form of the cell stack 100, but as illustrated in FIG. 1, the fixed wall 250 may have four surfaces, which support four-directional lateral surfaces of the cell stack 100 while facing the four-directional lateral surfaces, respectively, and be disposed so as to surround the cell stack 100.

At least a part of the fixed wall 250 of the receiving part 220 is in direct contact with the cell stack 100. For example, any one surface of the fixed wall 250 positioned in the first direction X may also be in direct contact with the cell stack 100, and any one surface of the fixed wall 250 positioned in a second direction Y perpendicular to the first direction X may also be in direct contact with the lateral surfaces of the plurality of unit cells 110, for example, the insulation member 112.

The second direction Y may be defined as a direction perpendicular to the first direction X on the same plane as that of the first direction X, and may be defined as a width direction of the unit cell 110 as illustrated in FIG. 1.

As described above, in one exemplary embodiment of the present invention, the cell stack 100 may maintain the shape by the fixed wall 250 even without a separate component, and may maintain a state pressed in the first direction X.

In a case of a related art general battery module, not the battery module 1000 of the present disclosure, a module frame is coupled to one cell stack and one cell stack, which is coupled with the module frame and is treated as a unit configuration, forms one module.

The generally treated cell stack may be coupled with a module frame for a performance aspect, such as energy density, and treatment easiness, and the module frame may be formed of end blocks pressing both ends of the cell stack, side plates extended alongside surfaces of the cell stack, and the like, and the end blocks and the side plates may be coupled with each other in the state where the cell stack is pressed to maintain the structure of the cell stack.

In a related art general battery module, the cell stack coupled with the module frame is inserted and the module housing is fastened to the module frame, and the general battery module becomes a battery module having the power amount provided by one cell stack.

In the case of the related art general battery module, a plurality of battery modules needs to be provided so as to meet higher power demanded than that of one cell stack, and thus, a module frame fastening the cell units into a unit body and a plurality of components configuring a module itself are additionally required.

Therefore, in the related art, a process for manufacturing the battery module may be increased, the consumption for the components may be increased, a weight of the battery module may be increased, and the time and cost required for manufacturing the battery module may be increased.

However, in the battery module 1000 according to one exemplary embodiment of the present invention, the plurality of cell stacks 100 is mounted to one module, unlike the related art general battery module, which is thus advantageous to meet the high power demanded, and the cell stack 100 is fixed by the fixed wall 250 of the receiving part 220, of which at least a part is separate from the outer wall 210 of the module housing 200, so that a component, such as a module frame, for fixing the cell stack 100, is not separately required.

That is, as shown in FIG. 1 and FIG. 2, in one exemplary embodiment of the present disclosure, a plurality of receiving parts 220 exists in one module housing 200, and the fixed wall 250 around the receiving part 220 is provided to fix each cell stack 100 while surrounding the same, unlike the outer wall 210 of the module housing 200.

Additionally, as shown in FIG. 1 to FIG. 2, the module housing 200 according to one exemplary embodiment of the present disclosure may further include end walls 240 that extend in the second direction Y and may be disposed at both ends of each of the plurality of receiving parts 220 in the first direction X to each engage (e.g., press or pressurize) the end surfaces of both sides of the cell stack 100, and the end wall 240 may correspond to a part of the fixed wall 250.

In one exemplary embodiment, the side surfaces of both ends of the cell stack 100 in the first direction X are defined as the end surfaces, respectively. According to one exemplary embodiment of the present disclosure, the end surface may correspond to the insulation member 112 or one surface of the end support 120.

FIGS. 1 and 2 illustrate a figure in which the end walls 240 are disposed at both sides of the cell stack 100 in the first direction X. A plurality of end walls 240 may exist in the module housing 200 and may correspond to both sides of the fixed wall 250 of the receiving part 220 in the first direction X.

The end wall 240 may be distinguished from the outer wall 210 of the module housing 200. For example, the end wall 240 has a shape protruding from the floor surface 260 in the inner space of the module housing 200 and extends in the second direction Y, and a plurality of end walls 240 may be disposed so as to be spaced apart from the outer wall 210 facing one surface or the other end wall 240 facing each other.

FIG. 1 illustrates a figure in which a plurality of receiving parts 220, for example a total of four receiving parts 220 are provided with two in the first direction X and two in the second direction Y, and one separation wall 230 that crosses a portion of the inner space of the module housing 200 in the first direction X and four end walls 240 extending in the second direction Y are provided.

The separation wall 230 is shared by the receiving parts 220 disposed at both sides in the second direction Y, and the end walls 240 are not shared at both sides in the length direction and the respective end walls 240 are disposed to be spaced apart from each other (e.g., by a gap) and with surfaces of the two receiving parts 220 facing each other in the first direction X.

That is, the end wall 240 may be disposed in a way that one side of the end wall 240 contacts the end surface of the cell stack 100 that is inserted into the corresponding receiving part 220 and the other side thereof is disposed apart from an outer wall 210 that faces thereto or an end wall 240 of another receiving part 220 that is disposed in parallel in the first direction X.

At least a part of each of the pair of end walls 240 disposed at both sides of the receiving part 220 in the first direction X is in direct contact with the facing end surface of the cell stack 100, for example, one surface of the end support 120. Further, the end wall 240 may be disposed to press the cell stack 100 in the first direction X.

As described above, in one exemplary embodiment of the present disclosure, the cell stack 100 inserted into the receiving part 220 is not fastened with a module frame, such as an end block or a side plate, but is provided in the form of which the lateral surfaces may be surrounded by the insulation member 112 in the state where the plurality of unit cells 110 is simply arranged, and in the battery module 1000, the end wall 240 may serve to press and fix the cell stack 100 in the first direction X.

The cell stack 100 is pressed in the first direction X to provide higher power under the same volume, and may be maintained in a structurally stable state.

The cell stack 100 may be inserted between the fixed walls 250 of the receiving part 220, such as between the pair of end walls 240 provided at both sides in the first direction X in the state of pressing the end surfaces and being pressed through a zig inserted into the receiving part 220, and may maintain a pressed state by the pair of end walls 240.

Figure 3:
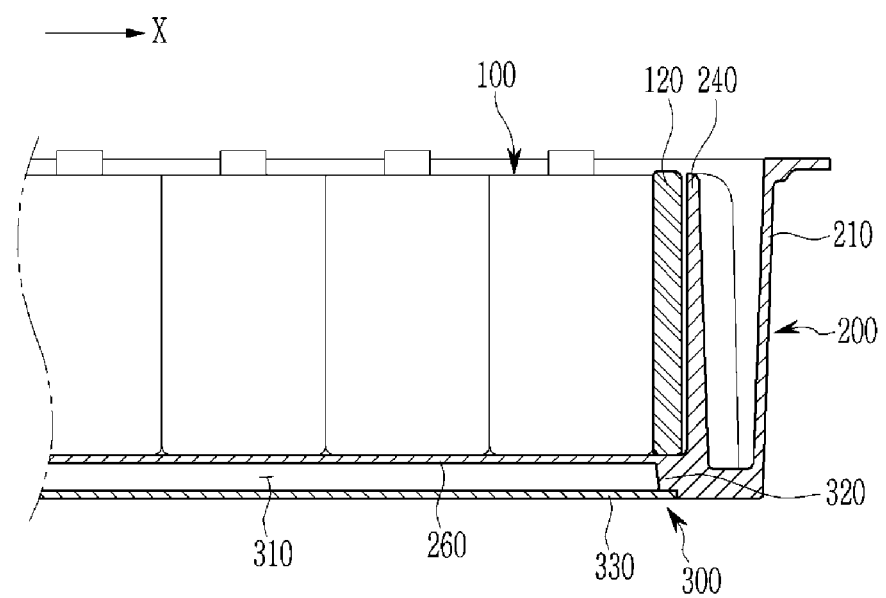
FIG. 3 is a view schematically illustrating a cooling channel in the battery module according to an exemplary embodiment of the present invention.
Figure 4:
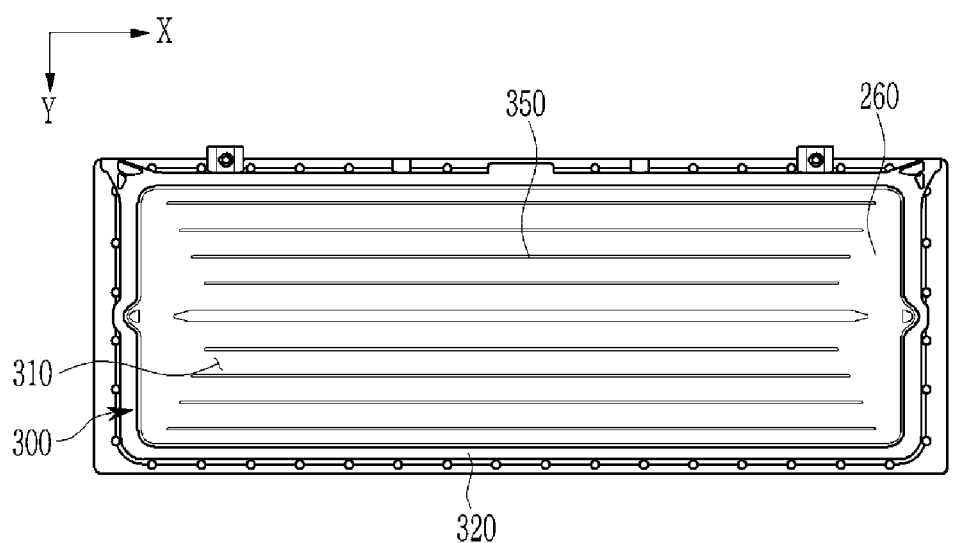
FIG. 4 is a view of the cooling channel in the battery module according to an exemplary embodiment of the present invention when being viewed from below.

FIG. 3 illustrates a cross section of the module housing 200 according to an exemplary embodiment of the present invention, and illustrates a figure in which a cooling channel 300 having a flowing space 310 in which a coolant flows is formed below the floor surface 260. FIG. 4 illustrates a bottom view of the cooling channel 300.

As shown in FIG. 3, in the battery module 1000 according to an exemplary embodiment of the present disclosure, the cooling channel 300 through which the coolant (e.g., coolant water) flows may be formed below the floor surface 260 of the module housing 200. In addition, a plurality of guide protrusions 350 extending in a flow direction of the coolant and guiding the flow of the coolant may be provided on a lower surface of the floor surface 260 as illustrated in FIG. 4.

The flowing space 310 of the cooling channel 300 may be formed across the entirety of the floor surface 260, or may also be formed to correspond to a cross sectional area of the inner space of the module housing 200 in which the receiving parts 220 are formed. For example, in one or more embodiments, the flowing space 310 of the cooling channel 300 may not exist below the first impact absorbing space 215. The coolant flows through the cooling channel 300, and various refrigerants such as air instead of the coolant may also be used.

The unit cells 110 constituting the cell stack 100 correspond to heating elements that dissipate heat during discharge, and in a case in which the temperature of the unit cells rises excessively, swelling may be induced or a thermal runaway phenomenon may occur where heat is rapidly increased due to abrupt chemical reaction and fire or the like occurs.

In addition, in a case in which the cell stack 100 in which the plurality of unit cells 110 are aligned is used as in an exemplary embodiment of the present disclosure, when the thermal runaway phenomenon occurs in any one of the unit cells 110, a thermal runaway diffusion phenomenon, which affects other peripheral unit cells 110, may also occur.

As described above, when the plurality of unit cells 110 are disposed, it is important to adequately cool the heat generated in the cell stack 100, and accordingly, the battery module 1000 according to an exemplary embodiment of the present disclosure efficiently implements the cooling of the entirety of the plurality of cell stacks 100 by forming the cooling channel 300 below the bottom surface 260 of the module housing 200.

In addition, in an exemplary embodiment of the present disclosure, the maintenance and management of the cooling channel 300 may be more easily performed by forming the cooling channel 300 below the bottom surface 260 of the module housing 200 rather than the inside of the module housing 200, that is, the inner space and the partitioned space of the module housing 200. For example, in an exemplary embodiment of the present disclosure, even when a module cover of the module housing 200 is assembled, the maintenance and management of the cooling channel 300 from a lower portion of the module housing 200 can be performed.

Additionally, in the battery module 1000 according to the exemplary embodiment of the present disclosure, the lateral wall 320 of the cooling channel 300 protrudes from the floor surface 260 in the down direction, is extended along a border of the floor surface 260 and is formed to surround the floor surface 260, and the channel cover 330 is coupled to a lower end of the lateral wall 320 to seal the cooling channel 300.

Further, the lateral wall 320 of the cooling channel 300 may be integrally formed with the floor surface 260 of the module housing 200 through a casting process, and the channel cover 330 may be welded and coupled to the lateral wall 320 of the cooling channel 300.

FIG. 3 illustrates the state where the lateral wall 320 of the cooling channel 300 extends along the border of the floor surface 260 of the module housing 200 to surround the floor surface 260, and protrudes from the floor surface 260 in the down direction.

In the exemplary embodiment of the present disclosure, the lateral wall 320 of the cooling channel 300 is integrally formed with the floor surface 260 of the module housing 200 through the cast process, so that a coupling region between the lateral wall 320 and the floor surface 260 does not exist, and thus, it is possible to prevent the coolant from unintentionally leaking into the module housing 200.

The channel cover 330 sealing the cooling channel 300 may be coupled to the lateral wall 320 of the cooling channel 300 by a method, such as welding, and a border of the channel cover 330 may be coupled to the lower end of the lateral wall 320.

The coupling method may be various, but a gasket may be provided or welded for preventing leakage of the coolant, and FIG. 13 illustrates the cooling channel 300 viewed from the bottom side in the state where the channel cover 330 is removed.

In an exemplary embodiment of the present disclosure, since lateral walls 320 of the cooling channel 300 protrude downward from the floor surface 260 of the module housing 320 and an opened lower part of the cooling channel 300 is coupled with the channel cover 330 such that the cooling channel 300 is closed and sealed, the cooling channel 300 is formed outside the module housing 200 and thus a risk in operation of the cell stack 100 due to a leakage of coolant in the cooling channel 300 can be effectively reduced.

In addition, all of the outer wall 210 and the floor surface 260 of the module housing 200 and the lateral wall 320 of the cooling channel 300 are integrally formed through the cast process, so that a water leakage possible region does not exist, and further, the cooling channel 300 is provided in the lower portion of the floor surface 260 of the module housing 200, that is, the outside of the internal space of the module housing 200, so that even if the coolant unintentionally leaks from the cooling channel 300, it is possible to prevent the coolant from flowing into the internal space of the module housing 200, in which the cell stack 100 is present.

As a result, in the exemplary embodiment of the present disclosure, the plurality of cell stacks 100 is inserted to simplify an assembling process and components and effectively satisfy high power demanded, it is possible to effectively cool the plurality of cell stacks 100 through the cooling channel 300, and further, it is possible to effectively protect the plurality of cell stacks 100 from the coolant leakage phenomenon in the cooling channel 300.

Figure 5:
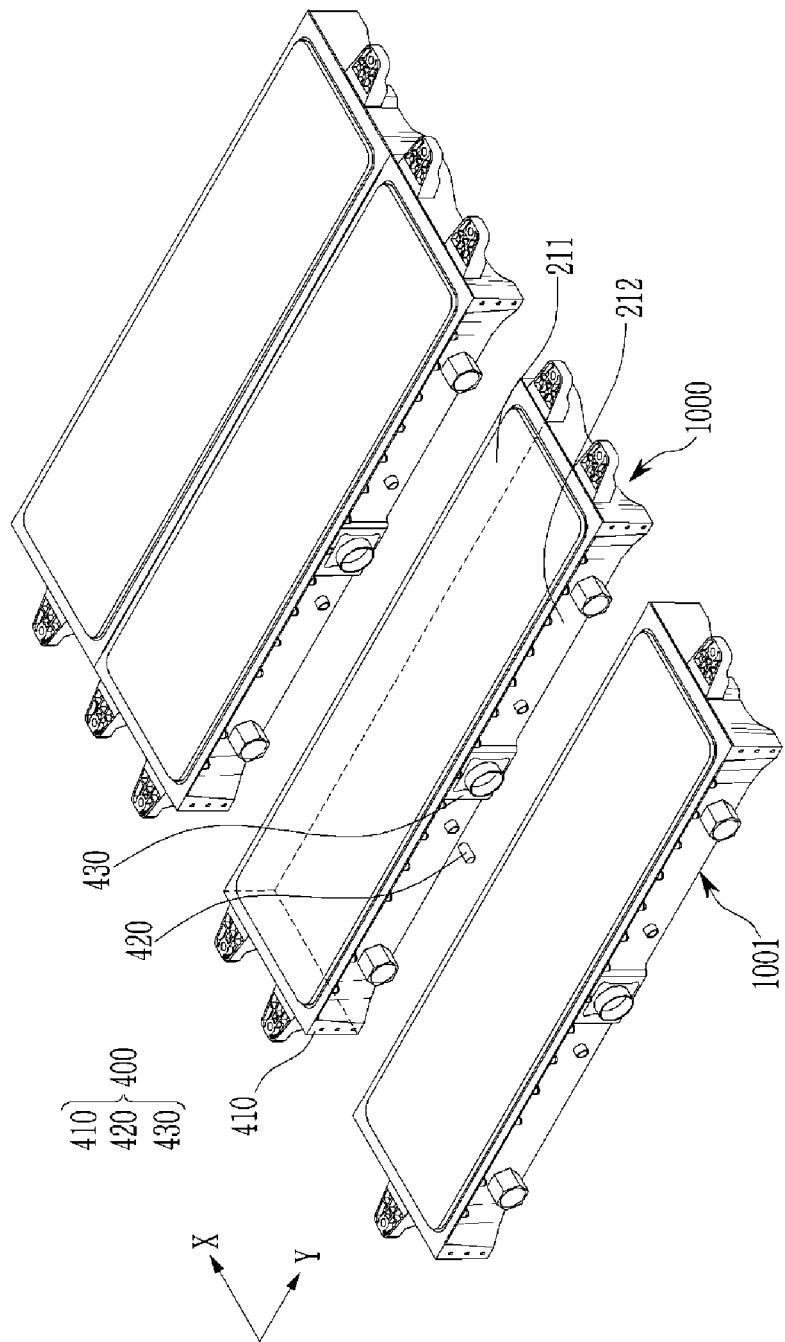
FIG. 5 is a view illustrating a figure in which battery modules according to an exemplary embodiment of the present invention are coupled to each other.

Meanwhile, FIG. 5 illustrates a figure in which a plurality of battery modules according to an exemplary embodiment of the present disclosure are provided and are interconnected. That is, FIG. 5 illustrates a figure in which the large modules of a battery are coupled to each other to form a large pack.

As illustrated in FIG. 5, the battery module according to an exemplary embodiment of the present disclosure may further include a coupling part 400 provided in the module housing 200 and coupled to the adjacent module housing 1001.

In the module housing 200 of the present invention the plurality of receiving parts 220 are provided to provide the plurality of cell stacks 100, thereby effectively achieving high output. In some cases, required power required by an electrical energy consuming device may exceed an output that can be provided by the battery module 1000 according to the exemplary embodiment of the present invention.

The battery modules 1000 may be coupled to each other to meet the required power, thereby making it possible to realize a large pack structure, and FIG. 5 illustrates a figure in which the coupling parts 400 between the corresponding module housing 200 and the adjacent module housing 1001 are coupled to each other.

The coupling part 400 may be provided in various types and shapes, and FIG. 5 illustrates fastening parts 410 fastened to each other through the fastening member, guide parts 420 aligning positions of the respective fastening parts 410 of the corresponding battery module and the adjacent battery module, and connection parts 430, which are connection passages of a bus bar 436 for electrical connection with the adjacent module housing 1001 according to an exemplary embodiment of the present invention.

Figure 6:
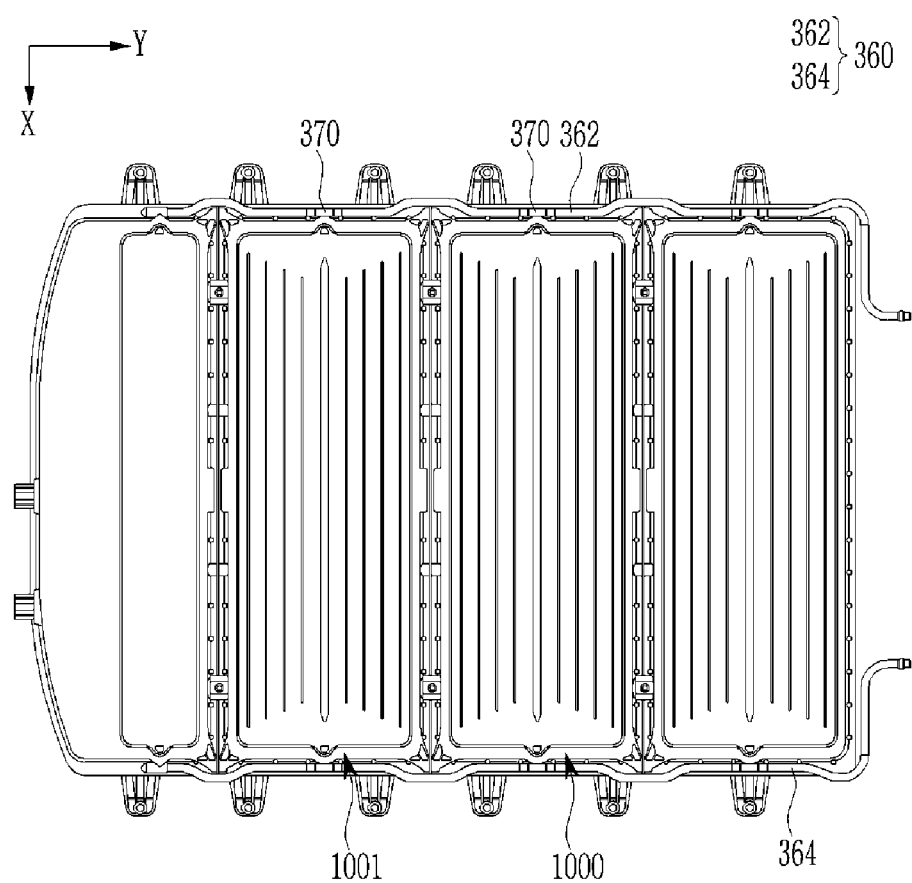
FIG. 6 shows that a battery module according to the exemplary embodiment of the present invention is connected in plural and coolant lines are coupled.

Additionally, in FIG. 6, a coolant line 360 coupled to the plurality of module housings 200 is illustrated. As shown in FIG. 6, the battery module 1000 according to the exemplary embodiment of the present invention may further include a coolant line that is connected together with each cooling channel of neighboring module housings 200.

The coolant line 360 is provided in the form or a pipe or a tube through which coolant flows, and may supply the coolant to the cooling channel 300 that is provided below the module housing 200 or receive the coolant discharged from the cooling channel 300. The cooling channel 300 connected to the coolant line 360 may cool the plurality of receiving parts 240 that are disposed above while the coolant flows through the cooling channel 300.

The coolant line 360 may be connected to the cooling channel of the corresponding module housing 200 and cooling channels 300 of neighboring module housings 200. Thus, even when the battery module 1000 according to the exemplary embodiment of the present invention is provided as a large pack in which a plurality of battery modules 1000 are coupled to each other, the respective cooling channels 300 of the plurality of module housings 200 can be cooled through one coolant line 360.

The coolant line 360 may be connected with the respective cooling channel 300 of the plurality of module housings 200 through various methods. The coolant line 360 may be a serial type in which coolant is supplied to one cooling channel 300 and coolant discharged from the cooling channel 300 is supplied to the adjacent cooling channel 300, and in one or more embodiments the coolant line 360 may be a parallel type in which any one of the coolant lines 360 supplies the coolant to the plurality of cooling channels 300 and the coolant discharged from the plurality of cooling channels 300 flows in the other coolant line 360.

Additionally, as shown in FIG. 6, in an exemplary embodiment of the present disclosure, the module housing 200 is coupled to the neighboring module housing 200 in a second direction Y that is perpendicular to the first direction X, and the coolant line 360 extends in the second direction Y, and may include a plurality of port connection holes 370 that are disposed apart from each other along a length direction and coupled to the cooling channel 300.

Since the module housing 200 is provided with a plurality of cell stacks 100, each in which a plurality of unit cells 110 are aligned, the module housing 200 may have a rectangular shape that extends in the first direction X in which the unit cells 110 are aligned, and the module housing 200 may include a coupling part 400 so as to be coupled with the neighboring module housing 200 in the second direction Y.

In addition, the coolant line 360 may have the plurality of port connection holes 370 that extend in the second direction Y and are disposed apart from each other so as to be connected to the respective cooling channels 300 of the plurality of module housings 200 that are aligned in the second direction Y as described above. In the large pack, the respective port connection holes 370 may be connected with cooling channels 300 of different module housings 200.

Figure 7:
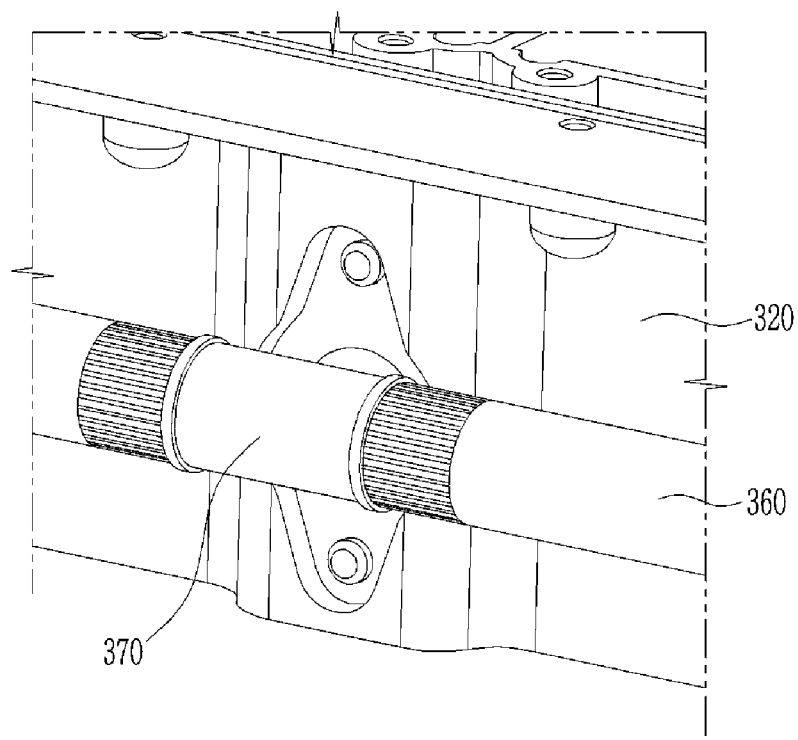
FIG. 7 shows that a port connection hole of the coolant line is coupled to a cooling channel in the battery module according to the exemplary embodiment of the present invention.

In FIG. 6, the coolant line 360 provided with the plurality of port connection holes 370 is illustrated, and FIG. 7 illustrates that different port connection holes 370 are connected to connection ports 325 that are respectively provided in the cooling channels 300.

One coolant line 360 extends in the second direction Y and is connected with a plurality of cooling channels 300 that are aligned in the second direction Y. That is, the coolant line 360 according to the exemplary embodiment of the present invention has a parallel form in which coolant is supplied to the plurality of cooling channels 300 or coolant discharged from the plurality of cooling channels 300 is recovered.

That is, in the exemplary embodiment of the present invention, the coolant line 360 extends in the second direction Y and thus simultaneously connected to the respective cooling channels 300 of the plurality of module housings 200 such that the coolant can be supplied to or recovered from the plurality of cooling channels 300, thereby improving structural safety and at the same time improving cooling efficiency.

Additionally, as illustrated in FIG. 5, in the battery module 1000 according to an exemplary embodiment of the present disclosure, the coupling parts 400 may be provided on a first wall 211 and a second wall 212 positioned in the second direction Y among the outer wall 210 of the module housing 200, and the coupling part 400 provided on the second wall 212 of the module housing 200 may be coupled to the coupling part 400 provided on the first wall 211 of the adjacent module housing 1001.

The coupling parts 400 may be disposed in the module housing 200, and as shown in FIG. 5, may be disposed on the outer wall 210 of the module housing 200. The coupling parts 400 may be respectively provided in every two sides that face each other among four sides of the outer wall 210 such that the plurality of battery modules can be coupled to each other.

In one or more embodiments, in the battery module 1000 according to an exemplary embodiment of the present disclosure, since the plurality of cell stacks 100 are inserted therein and the cell stacks 100 include the plurality of unit cells 110 aligned in the first direction X, the module housing 200 may have a cross section of a rectangular shape having a longer length in the first direction X.

Accordingly, even when the plurality of module housings 200 are aligned in one line or coupled to each other through the coupling parts 400, the coupling parts 400 may be disposed on the first wall 211 and the second wall 212 positioned in the second direction Y among the outer wall 210 of the module housing 200 so that an entire length of the plurality of module housings 200 may be reduced. However, a cross-section shape of the module housing 200 or a location of the coupling part 400 on the outer wall 210 may not be limited to the above-stated description.

Accordingly, the coupling part 400 disposed on the first wall 211 of any one of the module housings 200 may be coupled to the coupling part 400 disposed on the second wall 212 of the other of the module housings facing the first wall 211, and the coupling part 400 disposed on the second wall 212 of any one of the module housings 200 may be coupled to the coupling part 400 disposed on the first wall 211 of the other of the module housings 1001 facing the second wall 212.

Additionally, the coupling part 400 disposed in the first wall 211 in the outer wall 210 of the module housing 200 is inserted into the coupling part 400 of the neighboring module housing 1001 such that the corresponding module housing 200 and the neighboring module housing 1001 can be coupled to each other. For example, although it is not illustrated in FIG. 5, a fastening part 410, a guide pin of a guide part 420, and a tunnel insertion part of a connection part 430 may be disposed in the first wall 211.

In addition, the coupling part 400 disposed in the second wall 212 may be inserted into the coupling part 400 of the neighboring module housing 1001 such that the corresponding module housing 200 and the adjacent module housing 1001 may be coupled to each other. For example, as shown in FIG. 5, a fastening part 410, a guide pin of a guide part 420, and a connection tunnel of a connection part 430 may be disposed in the second wall 212. However, an insertion relationship and each constituent element of the coupling parts 400 disposed in the first wall 211 and the second wall 212, respectively, are not limited thereto.

Figure 12:
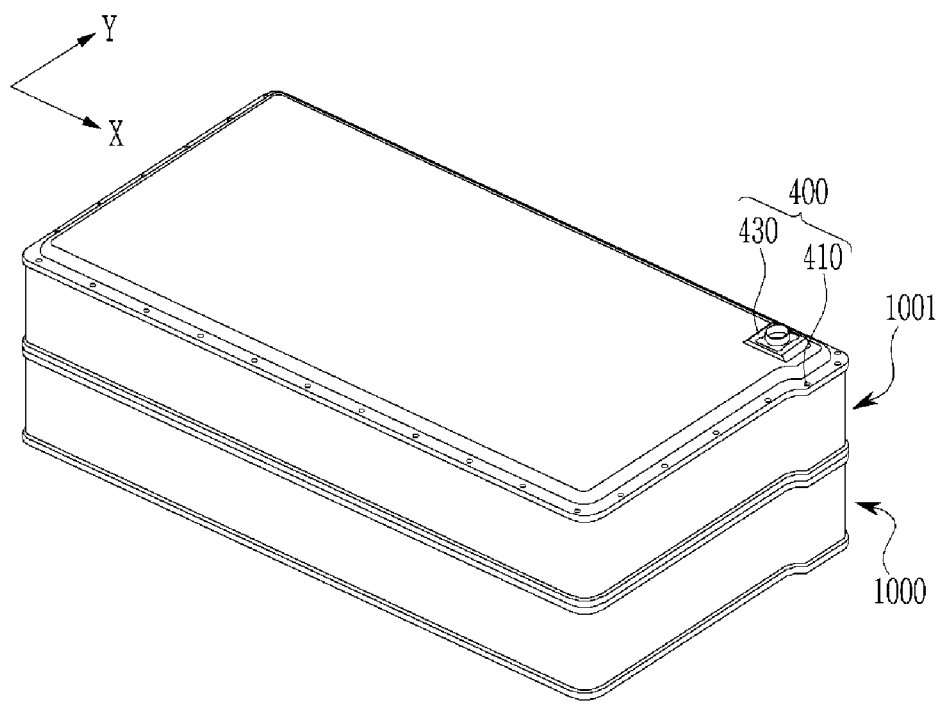
FIG. 12 is a view illustrating a figure in which battery modules according to another exemplary embodiment of the present invention are coupled to each other.

FIG. 12 illustrates a figure in which a plurality of battery modules according to another exemplary embodiment of the present disclosure are provided and are interconnected. That is, FIG. 12 illustrates a figure in which the battery modules are coupled to each other to form a large pack (e.g., a battery pack).

As shown in FIG. 12, the coupling parts 400 are formed on the upper surface (or module cover) and the bottom surface of the battery module, and the coupling parts 400 between the battery modules adjacent to each other are coupled to each other. Accordingly, the plurality of battery modules may be stacked in the vertical direction (directions perpendicular to the first direction X and the second direction Y) through the coupling parts 400.

For example, the connection part 430 disposed on the upper surface of the battery module 1000 may be inserted into the connection part 430 disposed on the bottom surface of the adjacent battery module 1001. In addition, the connection parts 430 may be connection passages of the bus bar for electrical connection with the adjacent battery modules.

Additionally, as shown in FIG. 6, in the battery module 1000 according to an exemplary embodiment of the present disclosure, the coolant line 360 includes an inflow line 362 through which coolant is supplied to the cooling channel 300 and an outflow line 364 through which coolant is supplied from the cooling channel 300, and the inflow line 372 is connected to one side of the cooling channel 300 in the first direction X and the outflow line 364 is connected to the other side of the cooling channel 300 in the first direction X.

The coolant line 360 may be formed of the inflow line 362 and the outflow line 362, and the inflow line 362 transmits coolant supplied to a water source to the cooling channel 300 and the outflow line 362 transmits coolant discharged from the cooling channel 300 back to the water source.

The water source stores or supplies coolant, and may be provided in various types and methods, and a cooling system may be provided to re-cool the coolant recovered from the cooling channel 300. As shown in FIG. 6, the inflow line 362 and the outflow line 364 may be extended in the second direction Y, and each may be connected to the entire cooling channels 300.

As shown in FIG. 5 and FIG. 6, in one exemplary embodiment of the present disclosure, the plurality of module housings 200 may be aligned along the second direction Y, and the coupling part 400 may be disposed in the first wall 211 and the second wall 212 of the second direction Y among the outer walls 210 of the module housing 200.

That is, when the plurality of module housing 200 are coupled to each other, each module housing 200 may be coupled with a module housing 1001 of which first and second walls 211 and 212 of the respective module housings are neighbored with each other, and accordingly, the coolant line 260 may be connected to the lateral wall 320 that is disposed on the first direction X of the cooling channel 300.

In one embodiment, the inflow line 362 may be connected on one lateral wall disposed on the first direction X among lateral walls 320 of the cooling channel 300, and the outflow line 364 may be connected on the other lateral wall, that is, the opposite lateral wall disposed in the first direction X among the lateral walls of the cooling channel 300.

In the cooling channel 300, the inflow line 362 and the outflow line 362 are disposed opposite to each other, and accordingly, in one exemplary embodiment of the present disclosure, the coolant can flow along the first direction X without consuming additional power in the cooling channel 300.

In addition, since the plurality of cooling channels 300 receive the coolant in a parallel manner, the plurality of cooling channels 300 substantially receive the cooing water having the same water temperature, thereby improving cooling performance.

Figure 8:
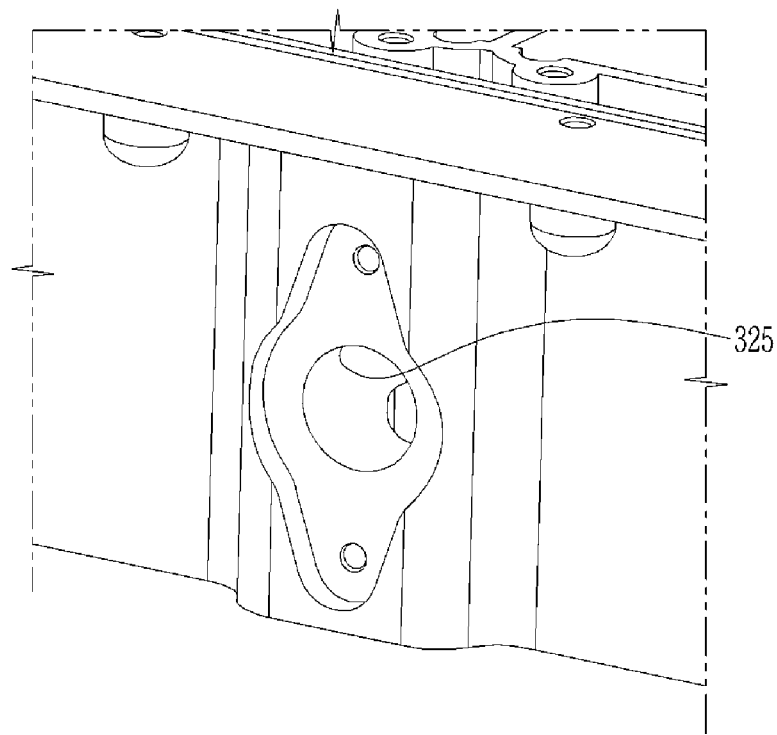
FIG. 8 shows a connection port to which the port connection hole is coupled in the battery module according to the exemplary embodiment of the present invention.

Meanwhile, FIG. 8 illustrates the connection portion 325 where the port connection hole 370 is engaged. In the drawing, the port connection hole 370 shown in FIG. 7 is omitted. In an exemplary embodiment of the present disclosure, at least one of the plurality of port connection holes 370 may have a different diameter from the rest.

In one exemplary embodiment of the present disclosure, the coolant line 360 is extended in the second direction Y and enables supplying coolant to the plurality of cooling channels 300 that are aligned in the second direction Y.

However, the number of receiving parts 240 formed in the module housing 200 may be different as desired as described above, and when each of the plurality of module housings 200 that are coupled to each other has a different number of receiving parts 240, the amount of coolant required for each module housing 200 may be different from one another.

In one or more embodiments, the amount of coolant supplied to the plurality of cooling channels 300 connected to one coolant line 360 may be different from each other depending on a distance from a water source.

Accordingly, in the exemplary embodiment of the present invention, at least one of the plurality of port connection holes 370 provided in the coolant line 360 is different in diameter from the rest so as to set a flow amount of coolant differently for each cooling channel 300.

The port connection hole 370 may be provided in a form that can be coupled to or separated from the coolant line 360, and accordingly, when a diameter of one port connection hole 370 is changed, the corresponding port connection hole 370 can be removed and a port connection hole 370 having a different diameter may be coupled to the corresponding location to thereby adjust a diameter.

The connection port 325 shown in FIG. 8 may be integrally formed with the cooling channel 300, or may be manufactured as a separate injection product and coupled to an opening of the cooling channel 300. The connection port 325 may be provided with a predetermined diameter range so that a plurality of port connection holes 370 of which diameters are included in the range can be coupled to the connection port 325, or may be exchangeable with another connection port 325 having a diameter that corresponding to a diameter of the corresponding port connection hole 370.

Additionally, referring back to FIG. 1 and FIG. 2, in the battery module 1000 according to an exemplary embodiment of the present disclosure, the module housing 200 may further include the separation wall 230 that extends in the first direction X, and partitions the inner space surrounded by the outer wall 210 to contribute to form the plurality of receiving parts 220, and the separation wall 230 may configure a portion of the fixed walls 250 of the two receiving parts 220 disposed at both sides along the second direction Y, and may be in contact with the side surfaces of the cell stack 100 inserted into each of the two receiving parts 220.

The side surfaces refer to both side surfaces extending in the first direction X among the side surfaces of the cell stack, and as described above, since the cell stack 100 according to the present invention does not include the separate module frame, the side surfaces may correspond to the insulation member 112 around (or surrounding) the side surfaces of the plurality of unit cells 110.

The separation wall 230 may be provided to protrude upwardly from a floor surface 260 of the module housing 200, and may be provided to divide the inner space of the module housing 200 while extending along the first direction X. That is, the separation wall 230 may correspond to a portion of the fixed wall 250 around (or surrounding) the receiving part 220, that is, one surface thereof.

Referring to FIGS. 1 and 2, the receiving parts 220 are formed at both sides of the separation wall 230, and the separation wall 230 becomes the fixed wall 250 for the two receiving parts 220 formed at both sides thereof.

Referring to FIG. 2, the separation wall 230 faces the side surfaces of the cell stack 100 inserted into the receiving part 220, and accordingly, the separation wall 230 corresponding to a portion of the fixed wall 250 is in direct contact with at least a portion of the side surfaces of the cell stack 100 inserted into the receiving part 220 to thereby support the cell stack 100 in the second direction Y.

Figure 9:
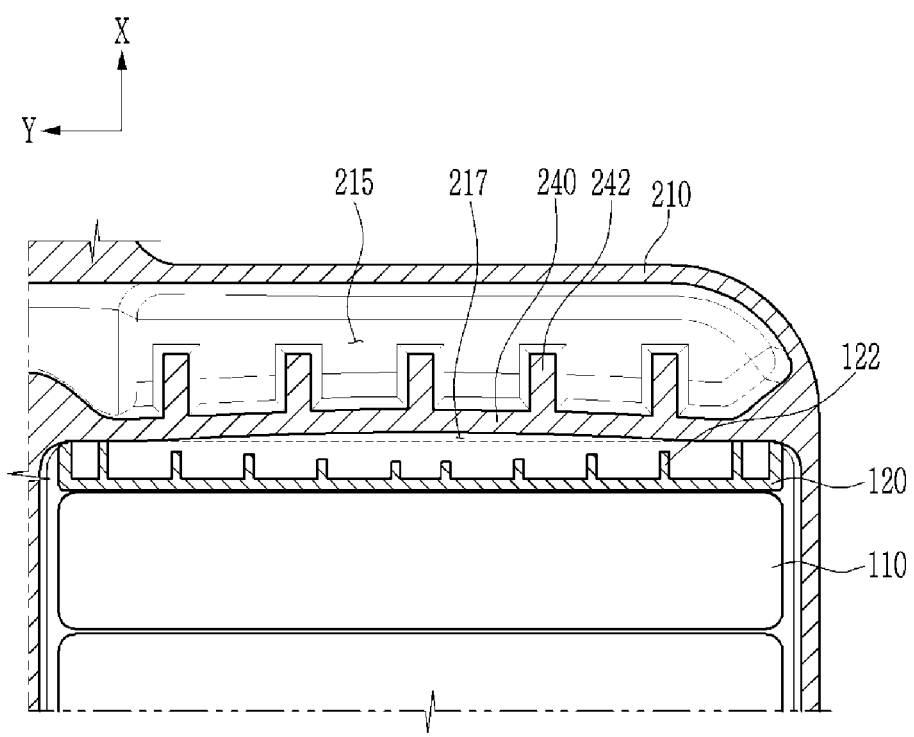
FIG. 9 is a view illustrating an end wall and an end support in the battery module according to an exemplary embodiment of the present invention.

Additionally, in FIG. 2, a part of the plurality of end walls 240 is provided at a distance from the outer wall 210 of the module housing 200, and FIG. 9 shows the end wall 240 spaced by a distance from the outer wall 210, viewed from the top side.

In an exemplary embodiment of the present disclosure, the end wall 240 among the end walls 240, which is disposed so that one surface faces the outer wall 210 of the module housing 200, may be spaced apart from the outer wall 210 in the first direction X and form the first impact absorption space 215 between the end wall 240 and the outer wall 210.

In an exemplary embodiment of the present disclosure, the plurality of end walls 240 may be provided as illustrated in FIGS. 1 and 2, the end wall 240 facing the outer wall 210 among the plurality of end walls 240 may be spaced apart from the facing outer wall 210 of the module housing 200 in the first direction X and form the first impact absorption space 215 between the end wall 240 and the outer wall 210 as illustrated in FIG. 2 and FIG. 9.

FIG. 9 illustrates the end wall 240 among the end walls 240 facing the outer wall 210 of the module housing 200 configuring the fixed wall 250 of the receiving part 220, and illustrates the first impact absorption space 215 formed between the end wall 240 and the outer wall 210.

The module housing 200 needs to safely protect the cell stack 100 inserted into the receiving part 220 against the impact transferred from the outside, and in an exemplary embodiment of the present among the end walls 240, the end wall 240, which is in direct contact with the end surface of the cell stack 100 and supports and presses the cell stack 100, is spaced apart from the outer wall 210, thereby preventing the impact transferred to the outer wall 210 from being directly transferred to the end wall 240.

Further, the safety of the battery can be improved because the impact transmitted from outside the module housing 200 by the first impact absorption space 215 is transmitted to the end wall 240 and the cell stack 100 in a reduced state.

Further, it is important to appropriately cool the unit cell 110 heating during use process, and the first impact absorption space 215 itself may advantageously serve as a heat radiating space, in which heat of the cell stack 100 is dispersed.

Additionally, in an exemplary embodiment of the present disclosure, as illustrated in FIGS. 1 and 2, the plurality of receiving parts 220 is disposed in the internal space of the module housing 200 in the first direction X, and in two receiving parts 220 adjacent in the first direction X, the end walls 240 disposed on surfaces facing in the first direction X are spaced apart from each other to form the second impact absorption space 216 between the end walls 240.

In FIG. 1, the module housing 200 where four receiving parts 220 are formed depending on the exemplary embodiment of the present invention is illustrated, and every two receiving parts 220 are aligned along the first direction X. However, the number of receiving parts 220 aligned along the first direction X may be different in one or more other embodiments.

In each of the two receiving parts 220 adjacent to each other in the first direction X, one surface, in which the fixed wall 250 of one receiving part 220 faces the fixed wall 250 of the other receiving part 220, the two receiving parts 220 have different end walls 240 facing each other. That is, the receiving parts 220 arranged in the first direction X do not share the end wall 240.

Referring to FIG. 2, it is illustrated the case where in the two receiving parts 220 arranged in the first direction X, the end walls 240 facing each other are spaced apart from each other, and the second impact absorption space 216 is formed between the end walls 240.

The second impact absorption space 216 protects the cell stack 100 inserted into the corresponding receiving part 220 from the impact transferred from the outside of the receiving part 220, like the first impact absorption space 215. For example, the first impact absorption space 215 may suppress the impact transferred form the outer wall 210 of the module housing 200 from being transferred to the internal space of the module housing 200, and the second impact absorption space 216 may suppress the impact transferred to any one receiving part 220 from being transferred to the other receiving part 220 adjacent in the first direction X.

Figure 11:
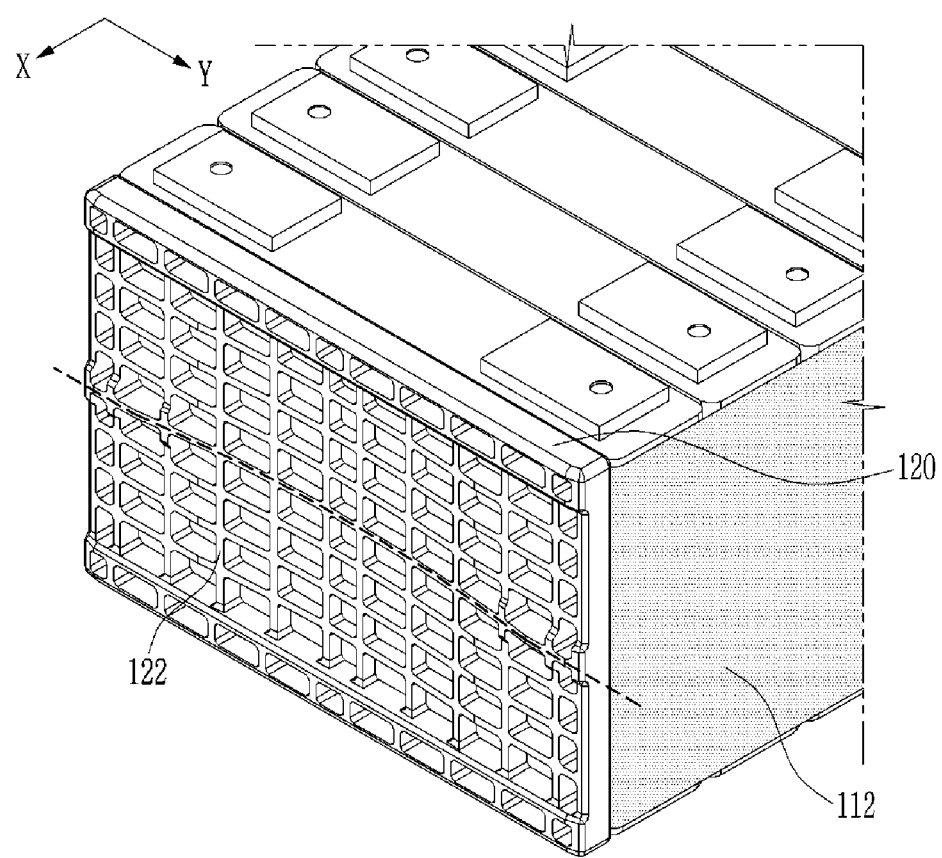
FIG. 11 is a view illustrating an end surface of the end support in the battery module according to an exemplary embodiment of the present invention.

Additionally, FIG. 9 illustrates that the end support 120 is disposed at an outer side of the outermost cell of the cell stack 100, and FIG. 11 shows an end surface of the end support 120.

As illustrated in FIGS. 9 and 11, in the battery module 1000 according to an exemplary embodiment of the present disclosure, the cell stack 100 may further include one pair of end supports 120, which is disposed at both end portions in the first direction X and of which an outer surface corresponds to the end surface.

In an exemplary embodiment of the present disclosure, the plurality of unit cells 110 is provided in the form of which at least the lateral surface is surrounded by the insulation member 112, and the end supports 120 may be disposed in the form in which the inner surface of each of the end supports 120 is in surface contact with the insulation member 112, at both ends of the cell stack 100 in the first direction X. However, a positional relationship between the insulation member 112 and the end support 120 are not essentially limited thereto.

The end supports 120 are disposed at both ends of the cell stack 100 in the first direction X, and the outer surfaces of the end supports 120 may correspond to the end surfaces. The end support 120 may serve to absorb impact between the end wall 240 and the plurality of unit cells 110, and may serve to uniformly transfer pressing force of the end wall 240 to the outermost cell among the plurality of unit cells 110.

The outermost cell means the unit cell 100 positioned at the outermost side in the first direction X among the plurality of unit cells 110 configuring the cell stack 100, and in an exemplary embodiment of the present disclosure, the outermost cell is disposed at each of both ends in the first direction X among the plurality of unit cells 110.

Even though the end wall 240 does not press the end support 120 with the entire surface thereof because the end wall 240 has the bent shape and the like, the end support 120 may press the insulation member 112 and the outer surface of the outermost cell with the entire surface thereof.

Figure 10:
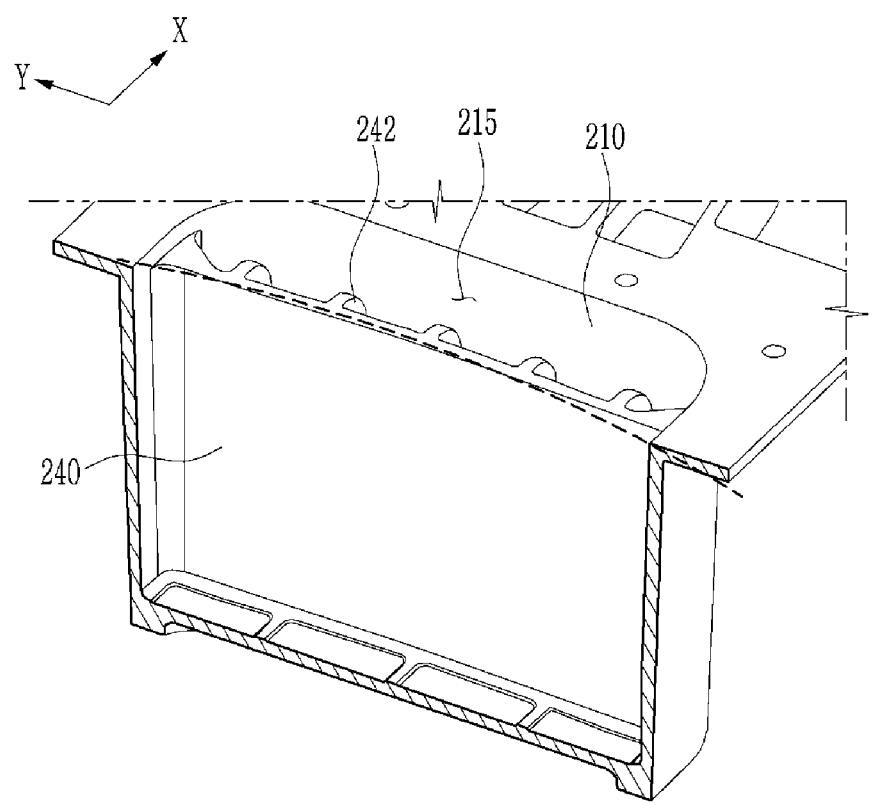
FIG. 10 is a view illustrating a shape of the end wall in the battery module according to an exemplary embodiment of the present invention.

Additionally, FIG. 9 illustrates the end wall 240, which is bent so that the center portion is further from the end surface, and FIG. 10 illustrates the inner surface looking at the end surface of the cell stack 100 in the bent end wall 240.

As shown in FIGS. 9 and 10, in the battery module according to an exemplary embodiment of the present disclosure, the end wall 240 is bent to the outside so that the center portion of the end wall 240 is further from the facing end surface, so that a swelling space 217 may be formed between the end wall 240 and the end surface.

The end wall 240 may be formed in the shape bent so that the center portion of the end wall 240 is further from the end surface that faces in the cell stack 100 inserted into the receiving part 220. Only the center portion may be concavely indented based in the second direction Y and the height direction, but the end wall 240 may be provided in the form bent so that the cross-section of the end wall 240 is curved, as illustrated in FIG. 9.

The end wall 240 has the bent shape, so that a space is formed at least the center portion between the end wall 240 and the end surface of the cell stack 100, and the corresponding space corresponds to the swelling space 217 in an exemplary embodiment of the present disclosure.

In the unit cell 110 of the cell stack 100, a swelling phenomenon, in which gas is generated from the internal electrode assembly and is expanded, may be generated according to deterioration of durability by the use and a peripheral situation, and the implementation of the structure, which is capable of appropriately treating the swelling, is beneficial in the structure, in which the plurality of unit cells 110 is arranged.

For example, when swelling occurs in any one of unit cells 110, other unit cells 110 of the cell stack 100 that includes the corresponding unit cell 110 may possibly experience the swelling, and when the swelling occurs in one unit cell 110 among the entire unit cells 110 and thus a thickness is increased, the entire length of the cell stack 110 may be greatly affected. Further, the length change of the cell stack 100 may affect the end wall 240 that presses the cell stack 100 in the first direction X such that a damage and the like may be caused.

When the swelling phenomenon occurs, the unit cells 110 have a large amount of expansion of the central portion on the side surface positioned in the first direction X due to structural characteristics thereof, and accordingly, in an exemplary embodiment of the present disclosure, the swelling space 217 is formed between the end wall 240 and the end surface so as to accommodate a volume expansion of the cell stack 100 due to the swelling when the swelling phenomenon of the cell stack 100 occurs.

Additionally, as described above, the cell stack 100 may be pressed or pressurized in the first direction X in terms of efficiency such as energy density and the like, and in an exemplary embodiment of the present invention, even though the central portion of the end wall 240 pressurizing the end surface is bent to be recessed, since at least the both end sides of the end wall 240 maintain a pressed or pressurized state of the end surface, the cell stack 100 is advantageously operated.

Furthermore, as shown in FIG. 9 and FIG. 11, the end surface may be concavely indented such that a center portion of the end surface may be away from the facing end wall 240. That is, the end wall 240 may have a shape in which a center portion of the end surface is concave.

In an embodiment in which the end support 120 is provided, the end surface corresponding to the outer surface of the end support 120 may have the shape, in which the center portion of the end surface is indented, so that a space is formed in at least the center portion between the end surface and the end wall 240 similar to the end wall 240 having the bent shape, and thus the swelling space 217 may be formed in at least the center portion between the end support 120 and the end wall 240.

For example, if swelling occurs in at least one of the plurality of unit cells 110 and thus a center portion of the unit cell 110 is expanded, a center portion of the end support 120 is pressed toward the end wall 240 due to the expansion of the center portion of the plurality of unit cells 110. However, the center portion of the end surface of the end support 120 is inwardly concave such that even when the center portion of the end support 120 is pressed to the outside or deformed, deformation or damage to the end wall 240 can be suppressed or prevented by the swelling space 217 formed between the end support 120 and the end wall 240.

Additionally, as shown in FIG. 2 and FIG. 9, a plurality of first ribs 242 may be formed in the end wall 240 according to the exemplary embodiment of the present invention. Particularly, the end wall 240 may include the plurality of first ribs 242 on the outer surface based on the first direction X.

In one or more embodiments, the end wall 240 is strong against impact from the outside while pressing the end surface of the cell stack 100, and further, even when the swelling space 217 is formed, the end wall 240 has mechanical strength, by which the end wall 240 is prevented from being damaged.

Accordingly, in an exemplary embodiment of the present disclosure, as illustrated in FIGS. 2 and 9, the plurality of first ribs 242 may be provided in the outer surface of the end wall 240, that is, one surface facing the outer wall 210 or a surface opposite to the cell stack 100.

The first rib 242 is formed on the outer surface of the end wall 240 for protecting the cell stack 100. The outer surface of the end wall 240 means a surface facing the opposite side of the end support 120. The first rib 242 may be separately manufactured and be coupled to the end wall 240, and the first rib 242 may be integrally formed with the end wall 240 by a cast process.

As illustrated in FIGS. 2 and 9, the plurality of first ribs 242 may be extended in the height direction of the end wall 240, and may be spaced apart from each other in the second direction Y.

The first rib 242 may be provided in the form extended in the height direction of the end wall 240, that is, may be extended toward the top side from the bottom side 260 of the module housing 200. Accordingly, the first rib 242 may effectively improve strength of the end wall 240 and may be integrally formed with the end wall 240 in a cast process using an upper mold and a lower mold.

Further, the plurality of first ribs 242 is spaced apart from each other in the second direction Y, thereby achieving uniformly and stably improving strength for the entire end wall 240. FIG. 9 illustrates a cross-section of the plurality of first ribs 242 spaced apart from each other in the second direction Y.

Additionally, FIG. 11 illustrates the end support 120 in which the plurality of second ribs 122 is formed on the end surface. As shown in FIG. 11, in an exemplary embodiment of the present disclosure, the end support 120 may include the plurality of second ribs 122 that protrude toward the end wall 240 in the end surface.

Swelling force transferred from the plurality of unit cells 110 is applied to the end support 120 at the time of the generation of swelling and the end support 120 responds to expansion of the unit cells 110, and therefore in one or more embodiments the end support 120 is strong again transformation and damage due to the swelling phenomenon.

Accordingly, the second rib 122 is formed on the end surface of the end support 120 to improve strength of the end support 120. That is, an inner surface of the end support 120, that is, the surface opposite to the end surface, is in surface contact with the outermost cell of the cell stack 100 or the insulation member 112 to uniformly secure pressing performance, and the second ribs 122 are formed on the end surface of the end support 120.

Further, as illustrated in FIG. 5, in n exemplary embodiment of the present disclosure, the second ribs 122 may be spaced apart from each other in the second direction Y and the height direction of the end support 120 so as to form a lattice shape.

Referring to FIG. 11, in an exemplary embodiment of the present disclosure, the second ribs 122 may be formed to approximately cross the entirety of the end surface in the extension direction, and some of the plurality of second ribs 122 are extended in the second direction Y and the remaining second ribs 122 are extended in the height direction of the end support 120, so that the plurality of second ribs 122 may be disposed to form a lattice form.

That is, the plurality of second ribs 122 may be disposed to be spaced apart from each other in the second direction Y and the height direction of the end support 120 to form a lattice shape, and accordingly, robustness of the end support 120 can be effectively improved.

That is, in the end support 120, quadrangular recesses may be approximately disposed in the lattice shape on the end surface, and the second rib 122 may be separately manufactured and be coupled to the end surface of the end support 120 or be integrally formed with the end support 120 when the end support 120 is manufactured.

Additionally, in an exemplary embodiment of the present disclosure, the fixed wall 250 of any one receiving part 220 may be defined to include the separation wall 230, one pair of end walls 240, and a part of the outer wall 210, and the separation wall 230 and the end walls 240 may be integrally formed through a cast process or the like.

Further, as illustrated in FIG. 2, in an exemplary embodiment of the present disclosure, one surface among the four surfaces of the fixed wall 250 corresponds to the separation wall 230, two other surfaces correspond to the end walls, respectively, and one remaining surface may be formed of the outer wall 210 of the module housing 200.

In the battery module 1000 according to n exemplary embodiment of the present disclosure, the end walls 240, the separation wall 230, and the outer wall 210 may be integrally formed with the floor surface 260 of the module housing 200 by a cast process.

That is, in an exemplary embodiment of the present disclosure, the end walls 240 and the separation walls 230 may be integrally formed with the module housing 200, and when a mold is manufacturing for the cast process, intaglio (i.e., an engraving) of the end walls 240 and the separation wall 230 may be integrally formed in the mold.

Further, in an exemplary embodiment of the present disclosure, the end walls 240 and the separation wall 230 may also be integrally formed with the outer wall 210 of the module housing 200. In this case, in the module housing 200, all of the outer wall 210, the separation wall 230, the end walls 240, and the floor surface 260 may be integrally formed.

As described, in the module housing 200 to which the end wall 240 and the separation wall 230 are integrally formed, an additional manufacturing process for including the end wall 240 and the separation wall 230 are components can be omitted, and as previously described, even when a module frame is omitted by the end wall 240 and the separation wall 230, the cell stack 100 can be stably fixed while the plurality of unit cells 110 are in a pressed stated in the receiving parts 220.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

| Description of symbols | |
|---|---|
| 100: cell stack | 110: unit cell |
| 120: end support | 122: second rib |
| 200: module housing | 210: outer wall of module housing |
| 211: first wall | 212: second wall |
| 215: first impact absorption space | 216: second impact absorption space |
| 220: receiving part | 230: separation wall |
| 240: end wall | 242: first rib |
| 250: fixed wall | 260: floor surface of module housing |
| 300: cooling channel | 310: flowing space |
| 320: lateral wall of cooling channel | 325: connection port |
| 330: channel cover | 350: guide protrusion |
| 360: coolant line | 362: inflow line |
| 364: outflow line | 370: port connection hole |
| 400: coupling part | 410: fastening part |
| 420: guide part | 430: connection part |
| 1000: battery module | |

What is claimed is:

1. A battery module comprising:
a first module;
a second module adjacent to the first module in a first direction and coupled to the first module,
wherein each of the first module and the second module comprises:
a plurality of cell stacks;
a module housing; and
a plurality of receiving parts in the module housing, the plurality of receiving parts being configured to accommodate the plurality of cell stacks; and a coupling part coupling the module housing of the first module to the module housing of the second module, wherein each of the plurality of receiving parts comprises a fixed wall, wherein the module housing of the first module is coupled to the module housing of the second module in a first direction, wherein a cooling channel for a coolant to flow to cool the plurality of receiving parts and the plurality of cell stacks is below a floor surface of the module housing, wherein the battery module further comprises a cooling plate coupled to the floor surface of the module housing, wherein the cooling channel is in the cooling plate, and a coolant line connected to the cooling channel of the module housing of each of the first and second modules, wherein the coolant line extends in the first direction and comprises a plurality of port connection holes spaced from each other along a length direction of the coolant line and coupled to the cooling channel of each of the first and second modules, wherein a plurality of guide protrusions extends on a lower surface of the floor surface in a second direction perpendicular to the first direction, the plurality of guide protrusions being spaced apart from each other in the first direction, and wherein lengths of the plurality of guide protrusions vary in the first direction.

2. The battery module of claim 1, wherein the cooling channel comprises at least one lateral wall that protrudes downward and surrounds the floor surface, the at least one lateral wall forms the cooling channel, and wherein each of the first module and the second module further comprises a channel cover coupled to lower ends of the at least one lateral wall to close and seal the cooling channel.

3. The battery module of claim 2, wherein the at least one lateral wall of the cooling channel is integral with the floor surface.

4. The battery module of claim 1, wherein the coupling part comprises a first coupling part in a first wall of the module housing of the first module and a second coupling part in a second wall of the module housing of the second module, wherein the first wall is spaced from the second wall in the first direction.

5. The battery module of claim 1, wherein the coolant line comprises:

an inflow line configured to supply coolant to the cooling channel; and an outflow line configured to discharge the coolant from the cooling channel, wherein the inflow line is connected to one side of the cooling channel of each of the first modules and the second module, wherein the outflow line is connected to another side of the cooling channel of each of the first module and the second module, and wherein the one side and the another side of the cooling channel are at opposite sides along a second direction perpendicular to the first direction.

6. The battery module of claim 1, wherein at least one of the plurality of port connection holes has a different diameter than at least one other port connection hole of the plurality of port connection holes.

7. The battery module of claim 1, wherein the module housing of each of the first module and the second module further comprises a separation wall that extends in a second direction perpendicular to the first direction and partitions an inner space surrounded by an outer wall of the module housing to form the plurality of receiving parts, and wherein the separation wall forms a part of the fixed wall of each of the plurality of receiving parts at sides along the first direction, the separation wall contacts side surfaces of a pair of cell stacks in respective receiving parts of the plurality of receiving parts.

8. The battery module of claim 7, wherein the fixed wall comprises a pair of end walls at opposite ends of each of the receiving parts in the second direction, and wherein an end wall of the pair of end walls facing the outer wall of the module housing is spaced apart from the outer wall along the second direction and forms a first impact absorption space between the end wall and the outer wall.

9. The battery module of claim 8, wherein the plurality of receiving parts comprises two receiving parts adjacent to each other along the second direction, and wherein end walls of the two receiving parts facing each other in the second direction are spaced apart from each other to form a second impact absorption space between the end walls.

10. The battery module of claim 8, wherein each cell stack of the plurality of cell stacks comprises a pair of end supports at opposite end portions in the second direction, the pair of end supports having outer surfaces corresponding to respective end surfaces of a corresponding cell stack accommodated in each of the receiving parts.

11. The battery module of claim 10, wherein the end walls are bent outwardly such that central portions of the end walls are spaced from the end surfaces, and wherein the end surfaces are recessed inwardly such that central portions of the end surfaces are spaced from the end walls.

12. The battery module of claim 11, wherein at least one end wall of the end walls comprises a plurality of first ribs that protrude in the second direction from an outer surface, the plurality of first ribs spaced from each other in the first direction and extend in a third direction perpendicular to each of the first direction and the second direction.

13. The battery module of claim 12, wherein at least one end support of the pair of end supports comprises a plurality of second ribs protruding toward the at least one end wall from the end surface and spaced from each other in the first direction and the third direction.

14. The battery module of claim 13, wherein the plurality of second ribs has a lattice structure.

* * * * *